United States Patent [19]

Baudelaire et al.

[11] Patent Number: 5,337,404
[45] Date of Patent: Aug. 9, 1994

[54] PROCESS AND SYSTEM FOR MAKING COMPUTER-AIDED DRAWINGS USING A CONTOUR INCLUSION TREE ASSOCIATED PLANAR MAP DATA STRUCTURE

[75] Inventors: Patrick Baudelaire, L'Etang la Ville; Michel Gangnet, Germain en Laye; Jean-Claude Herve; Thierry Pudet, both of La Garenne-Colombes; Jean-Manuel V. Thong, Courbevoie, all of France

[73] Assignee: Digital Equipment International Limited, Fribourg, Switzerland

[21] Appl. No.: 513,247

[22] Filed: Apr. 20, 1990

[30] Foreign Application Priority Data

Apr. 24, 1989 [FR] France ............ 89 05416

[51] Int. Cl.⁵ .................................. G06F 15/62
[52] U.S. Cl. ........................ 395/141; 395/142; 395/127
[58] Field of Search ............ 395/101, 102, 119, 120, 395/125–127, 128–132, 141–143, 161

[56] References Cited

U.S. PATENT DOCUMENTS

| | | | |
|---|---|---|---|
| 3,778,541 | 12/1973 | Bowker | 356/175 X |
| 4,590,558 | 5/1986 | Glover et al. | 395/119 X |
| 4,855,934 | 8/1989 | Robinson | 395/130 |
| 4,949,286 | 8/1990 | Ohba | 395/125 |
| 5,140,532 | 8/1992 | Beckwith, Jr. et al. | 395/101 |

*Primary Examiner*—Heather R. Herndon
*Assistant Examiner*—Almis Jankus
*Attorney, Agent, or Firm*—Flehr, Hohback, Test, Albritton & Herbert

[57] ABSTRACT

Process for making computer-aided drawings for applications such as computer-aided engineering (CAE) and computer-aided design (CAD). A drawing is made in the form of a planar map in all steps of its implementation, and the process proceeds iteratively with insertion, erasure, or coloring operations as the drawing is made.

32 Claims, 17 Drawing Sheets

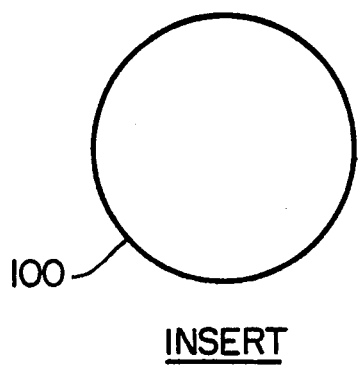
INSERT
FIG_1a
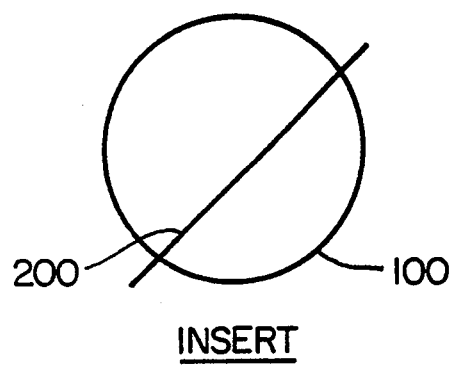
INSERT
FIG_1b
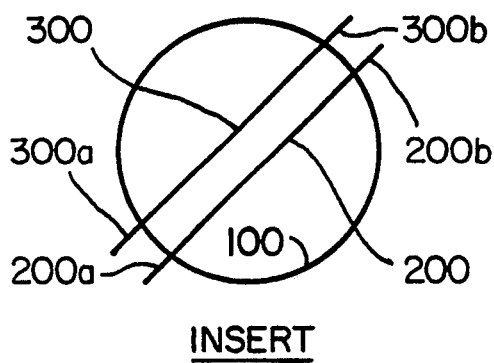
INSERT
FIG_1c
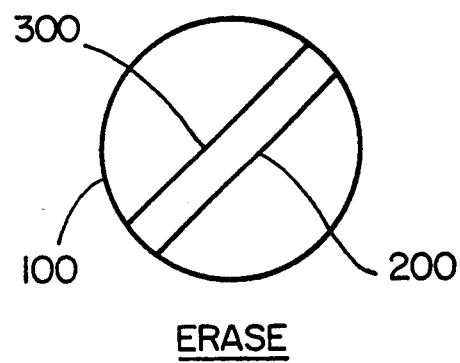
ERASE
FIG_1d
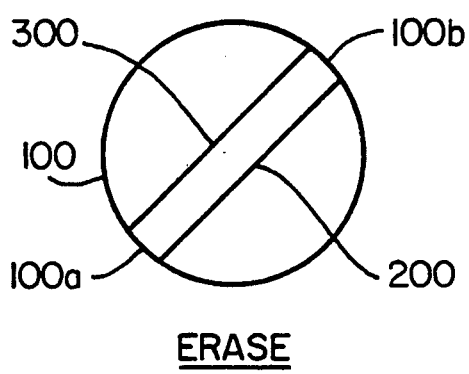
ERASE
FIG_1e
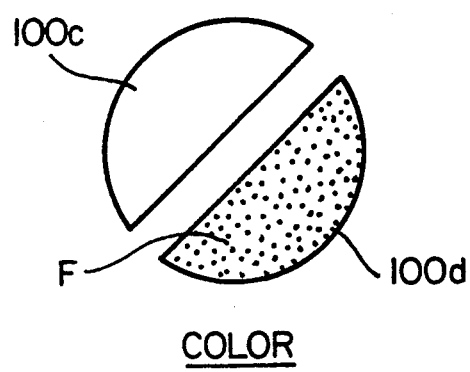
COLOR
FIG_1f

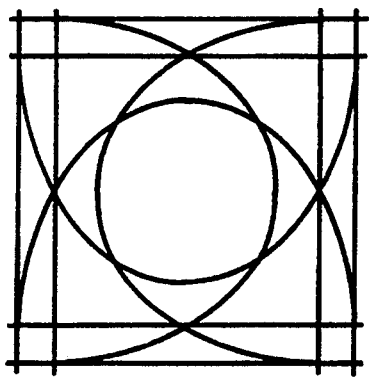
FIG_2a
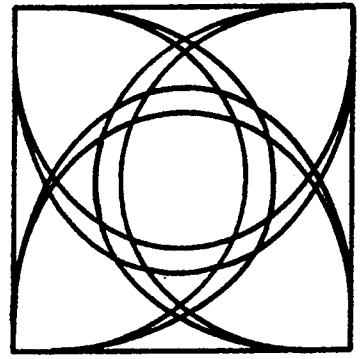
FIG_2b
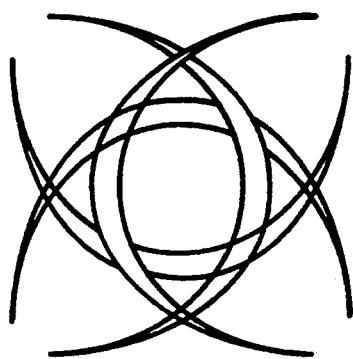
FIG_2c
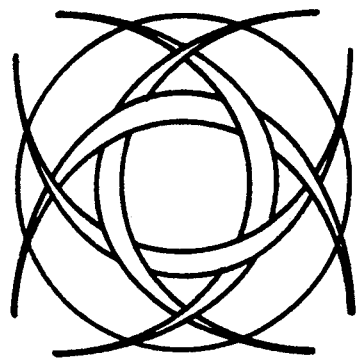
FIG_2d
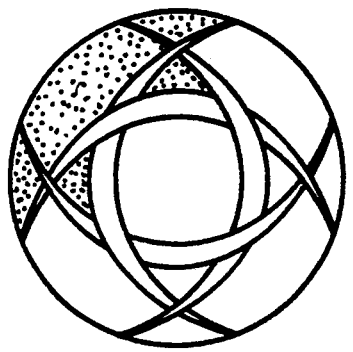
FIG_2e
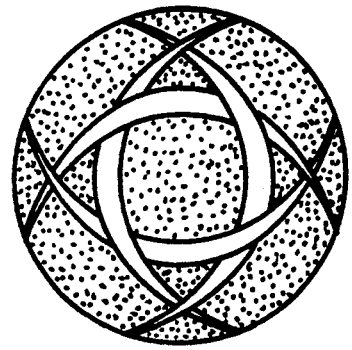
FIG_2f

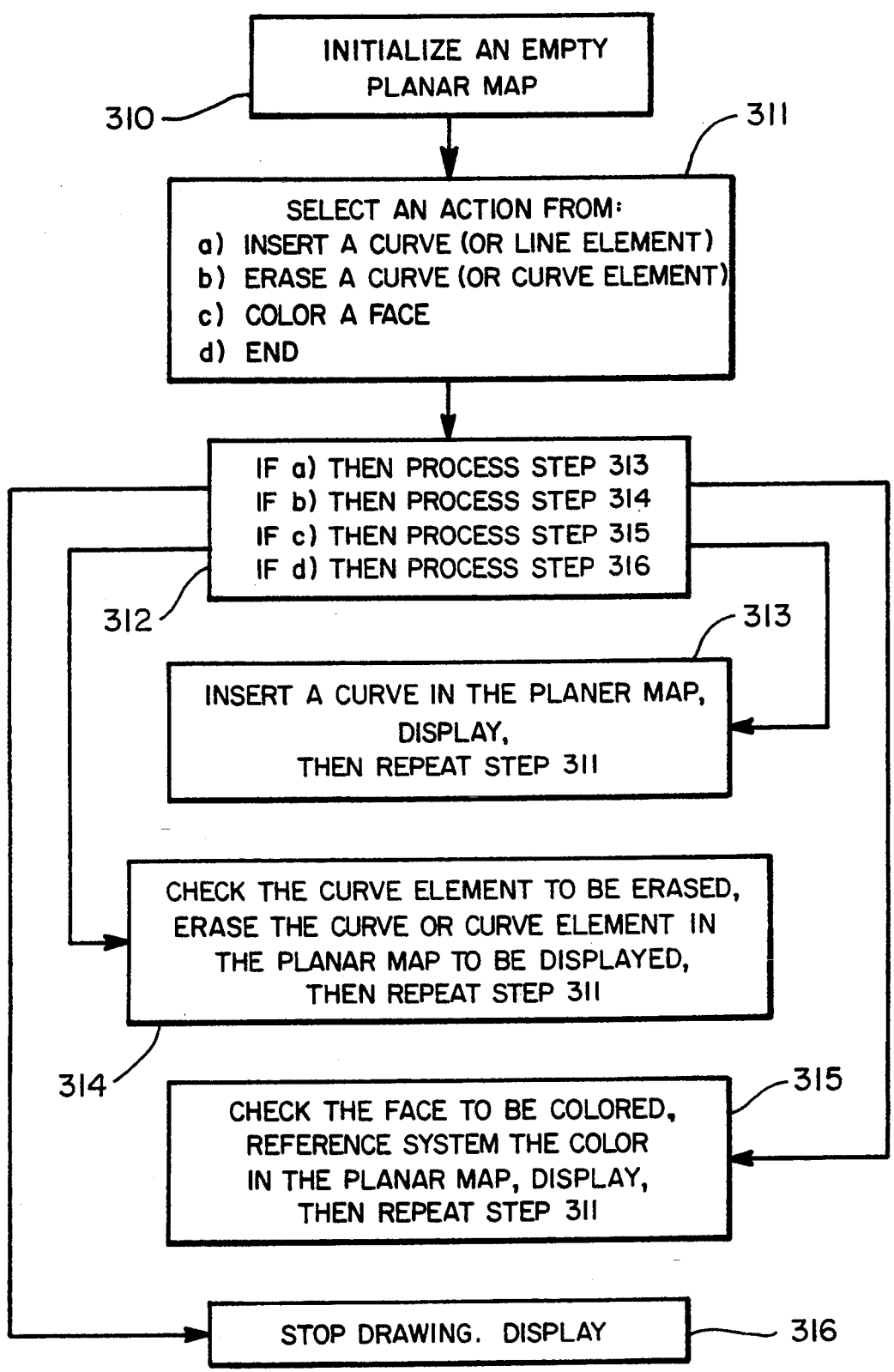
FIG_3

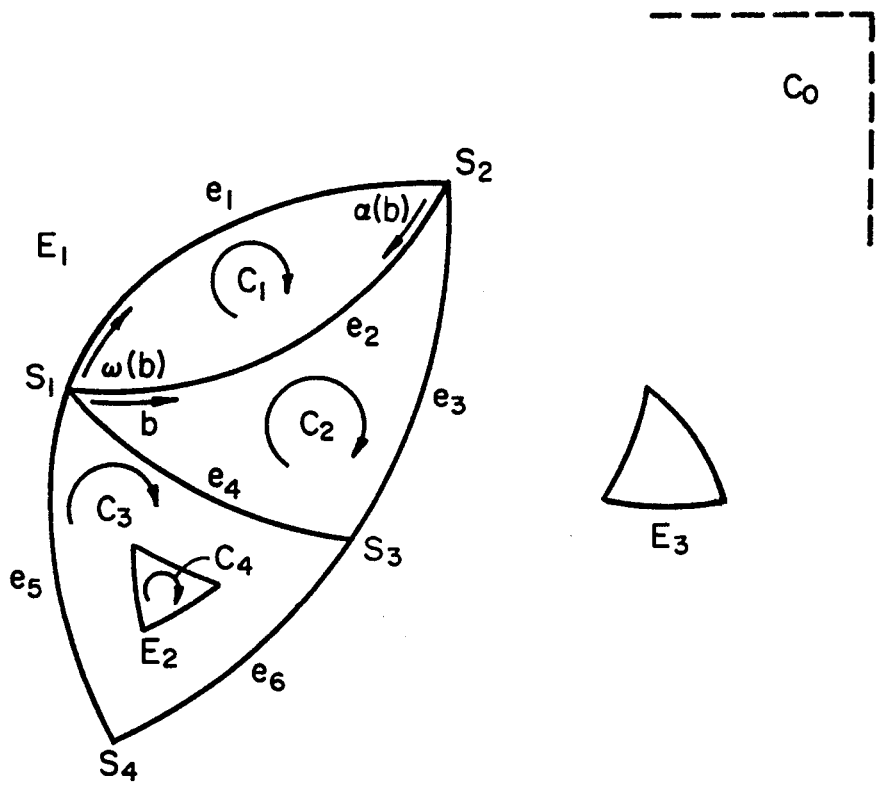
*FIG_4a*
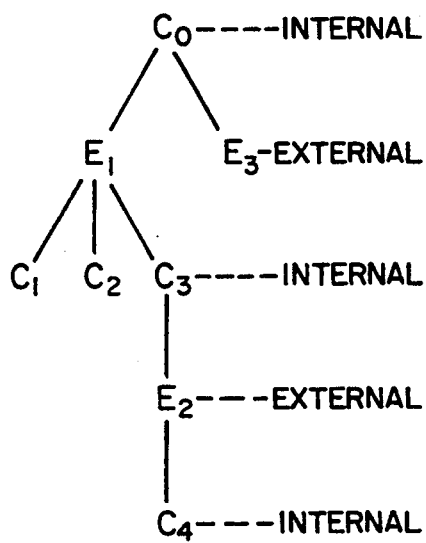
*FIG_4b*
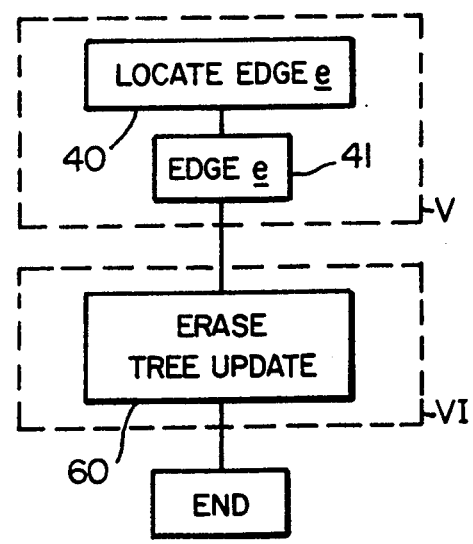
*FIG_5b*

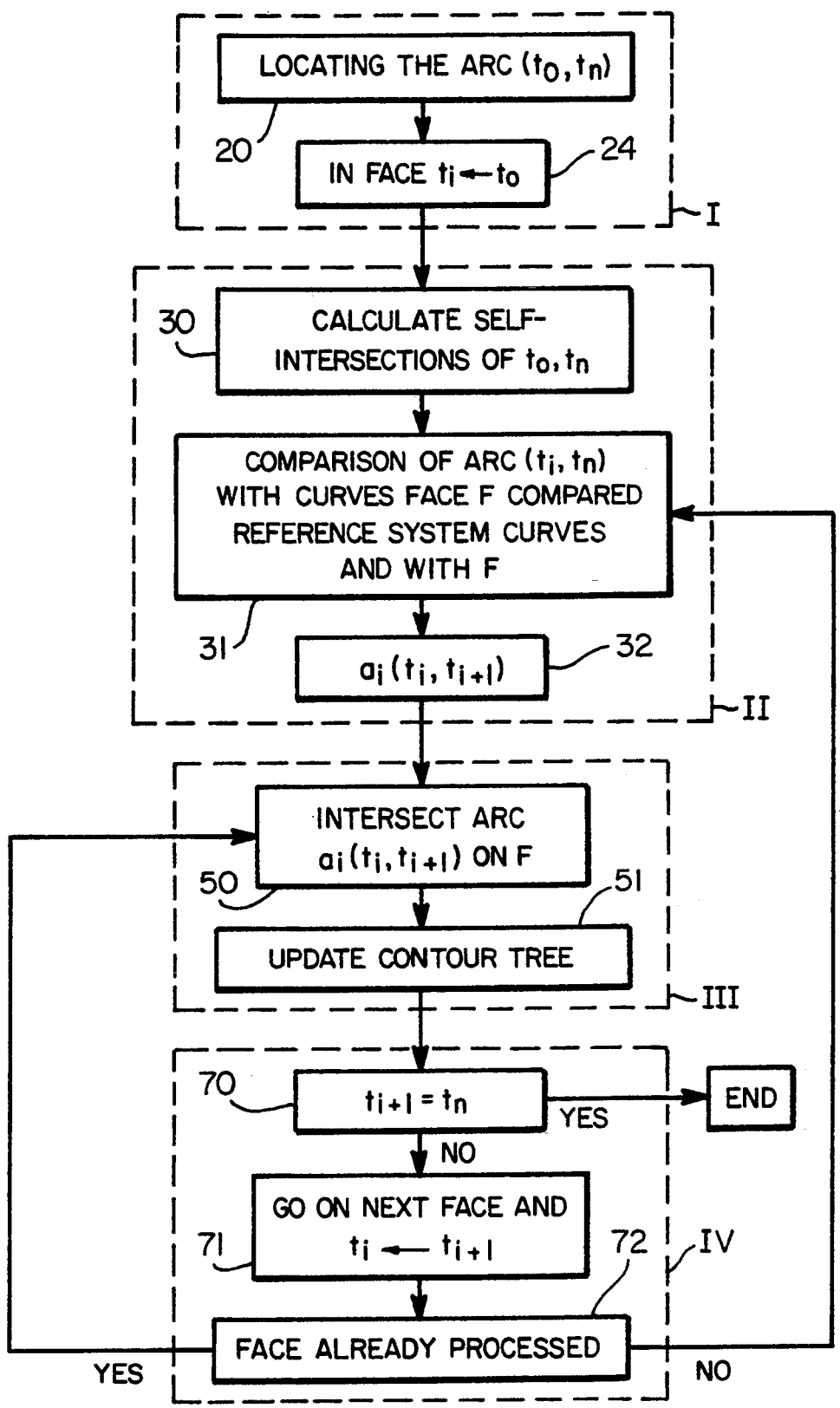
FIG_5a

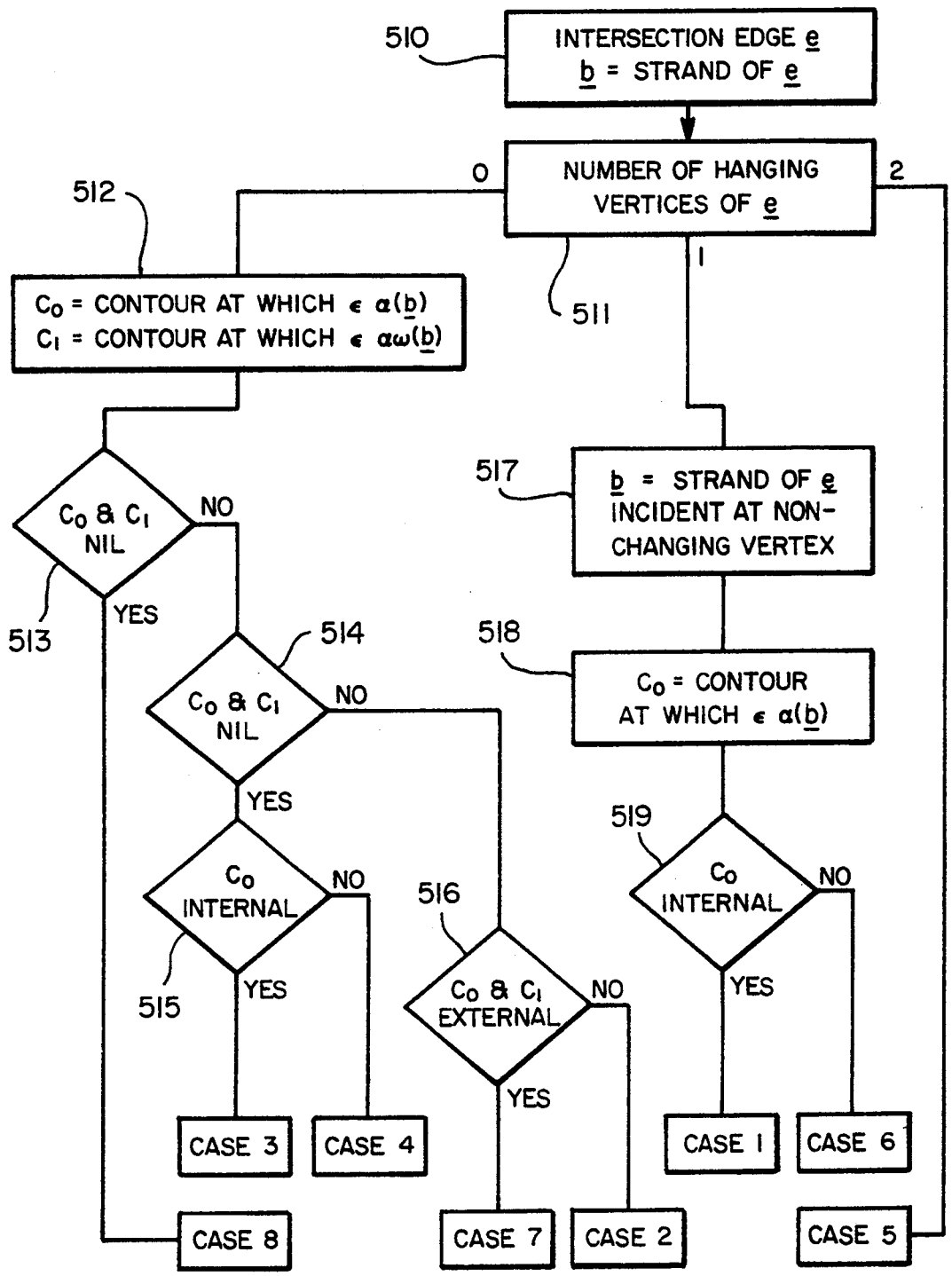
FIG_6a

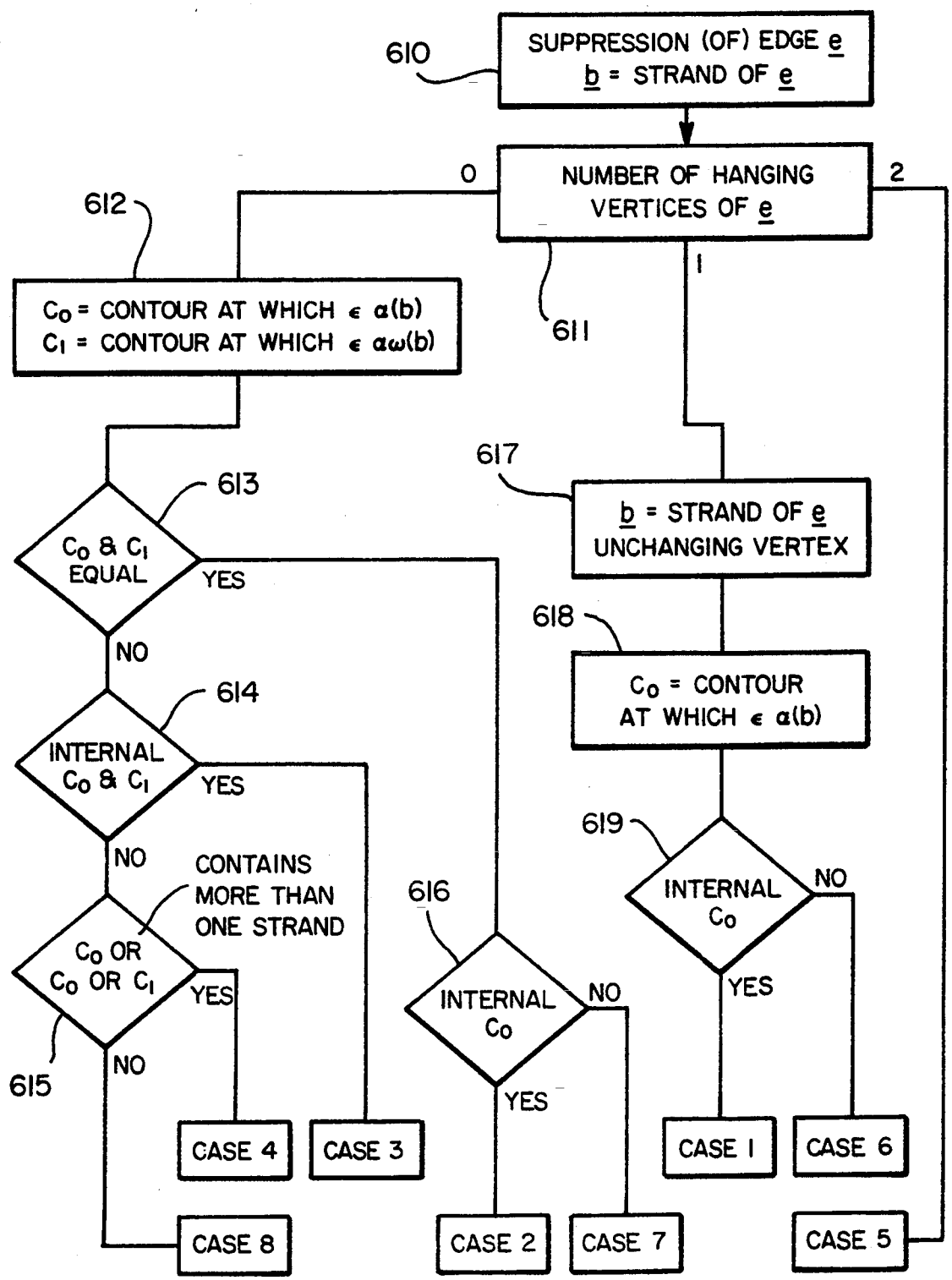
FIG_6b

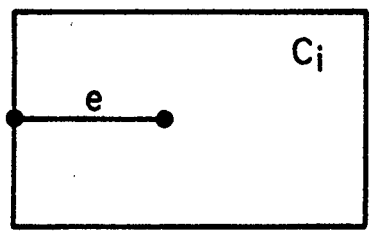
CASE 1
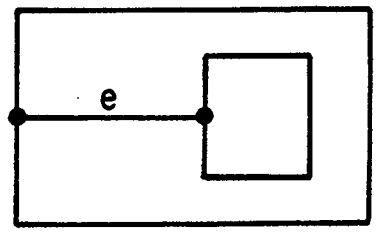
CASE 2
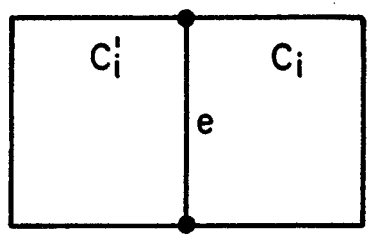
CASE 3
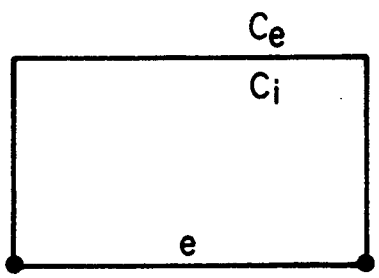
CASE 4
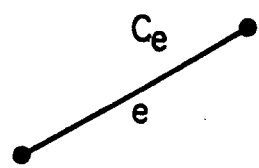
CASE 5
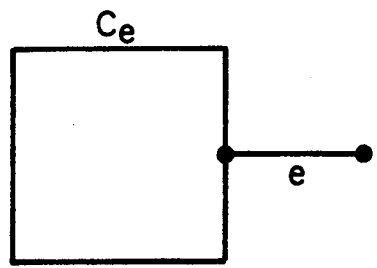
CASE 6
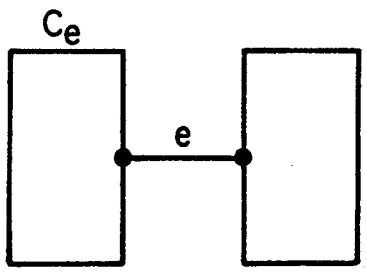
CASE 7
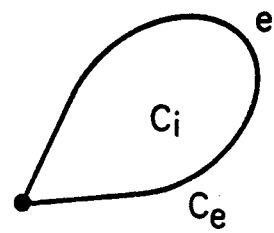
CASE 8
FIG_7

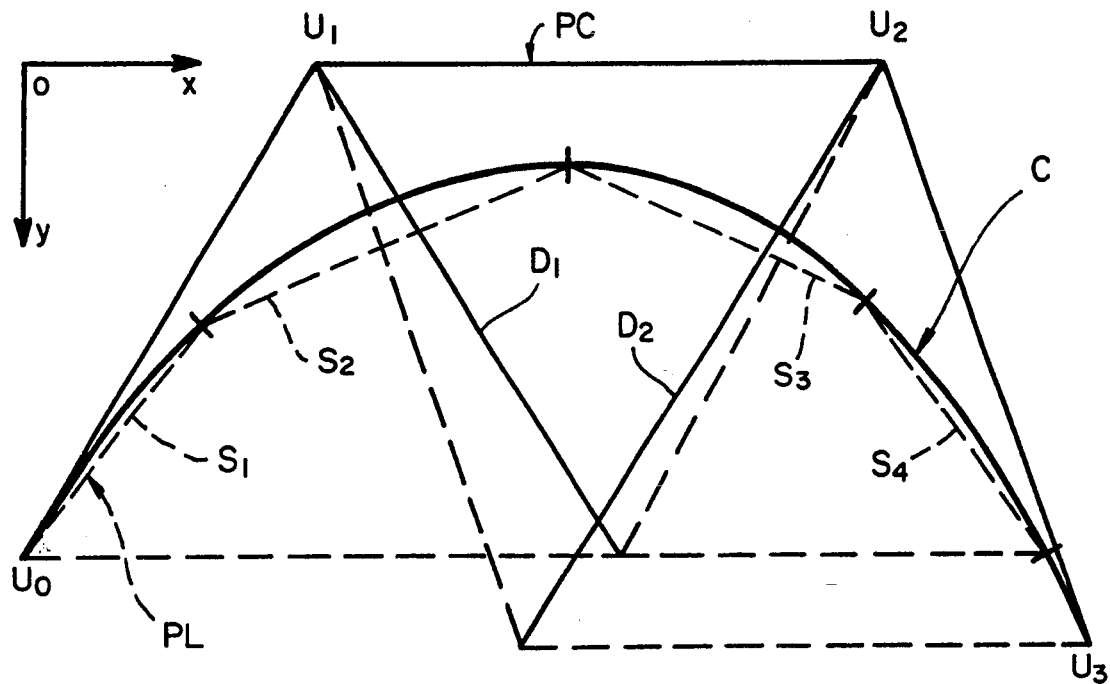
FIG_8
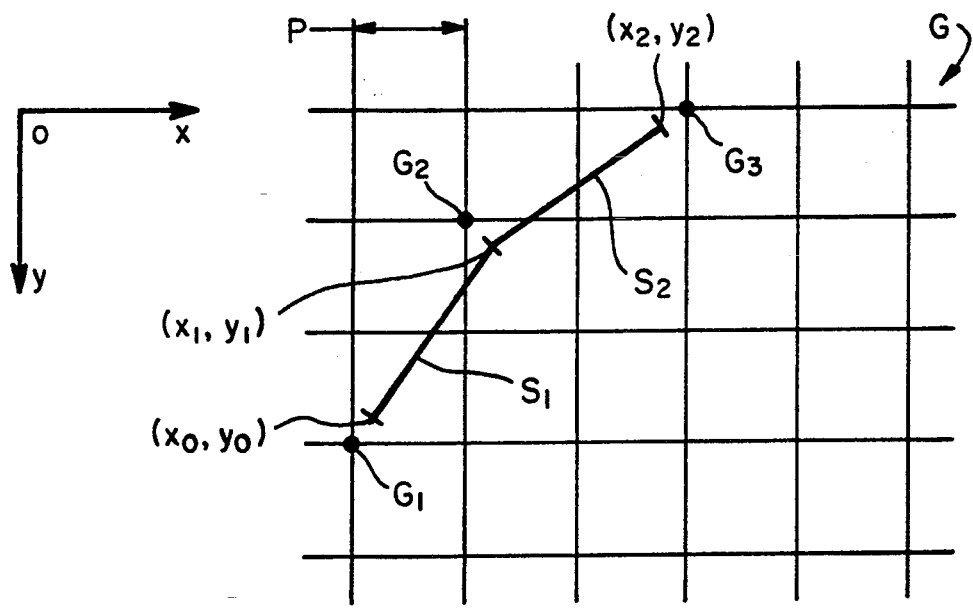
FIG_9

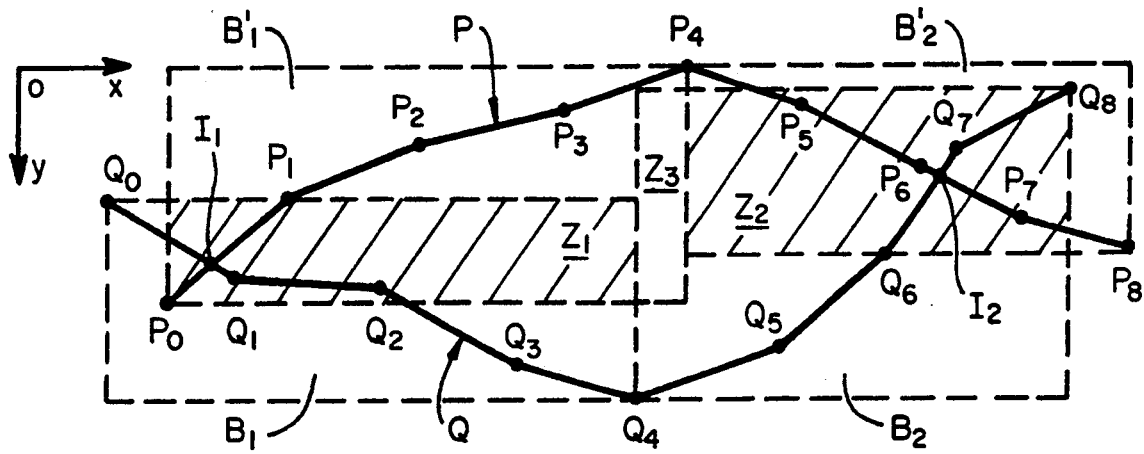
FIG_10
FIG_11

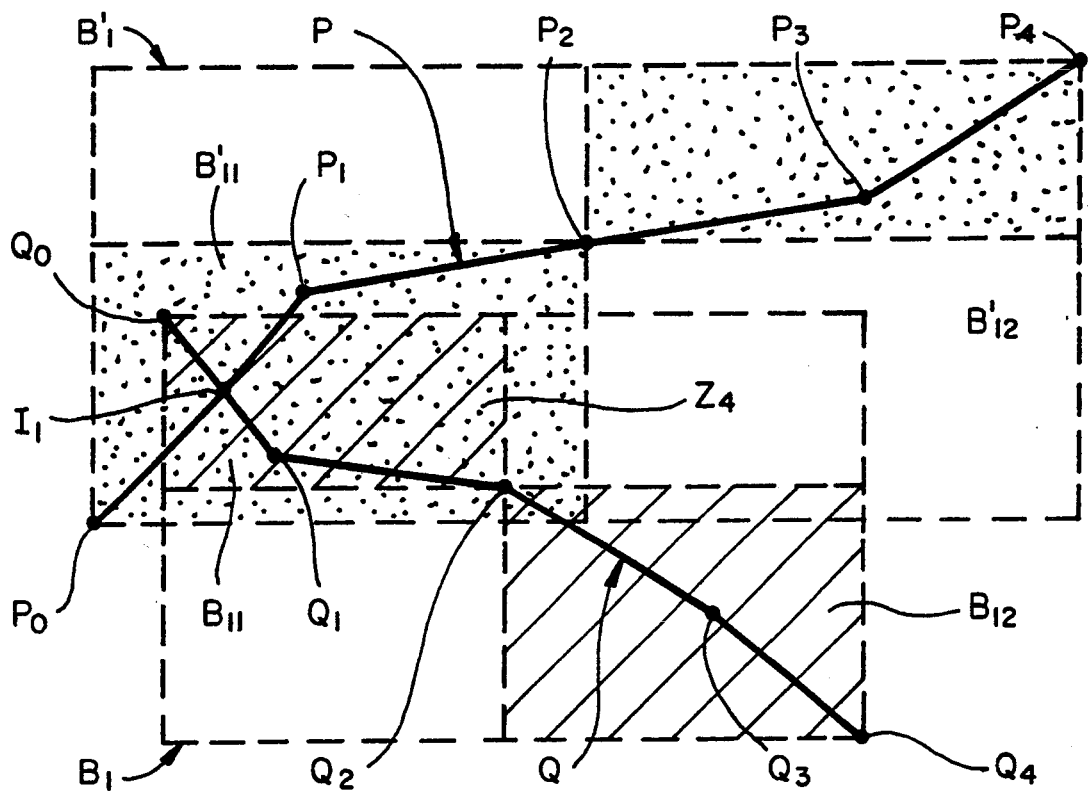
FIG_12
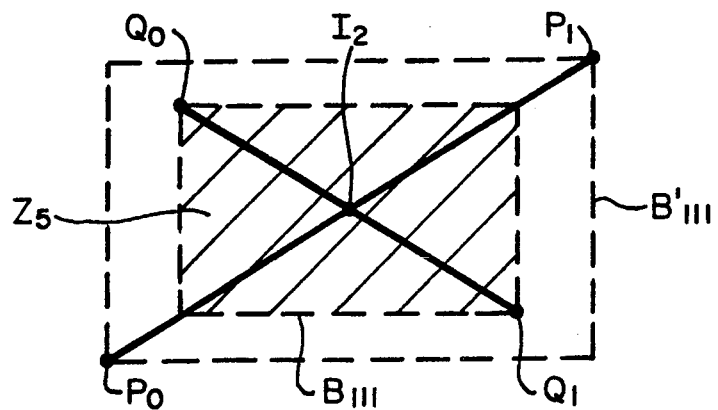
FIG_13

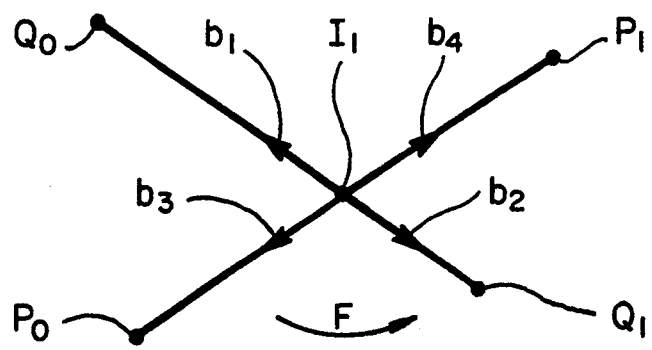
FIG_14
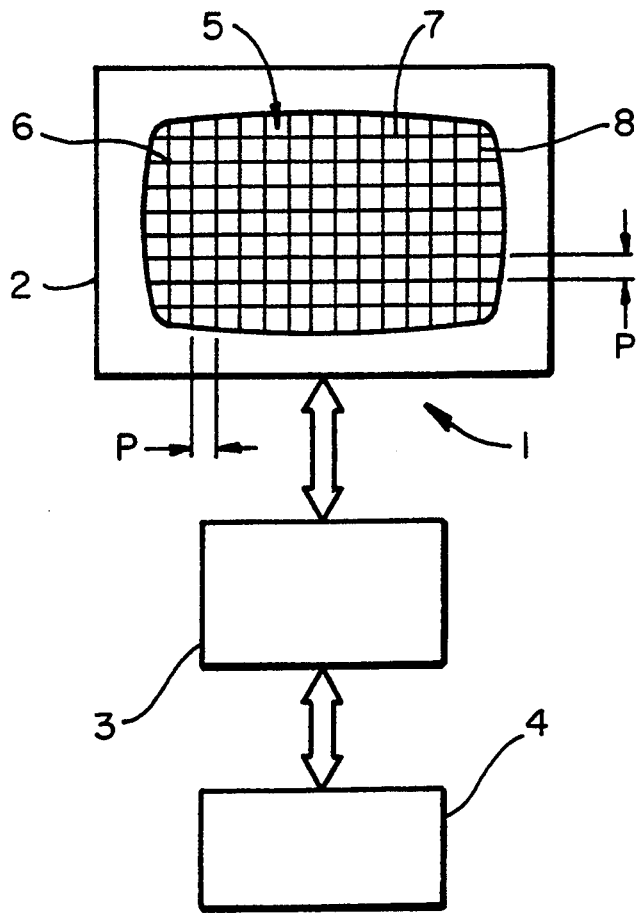
FIG_16

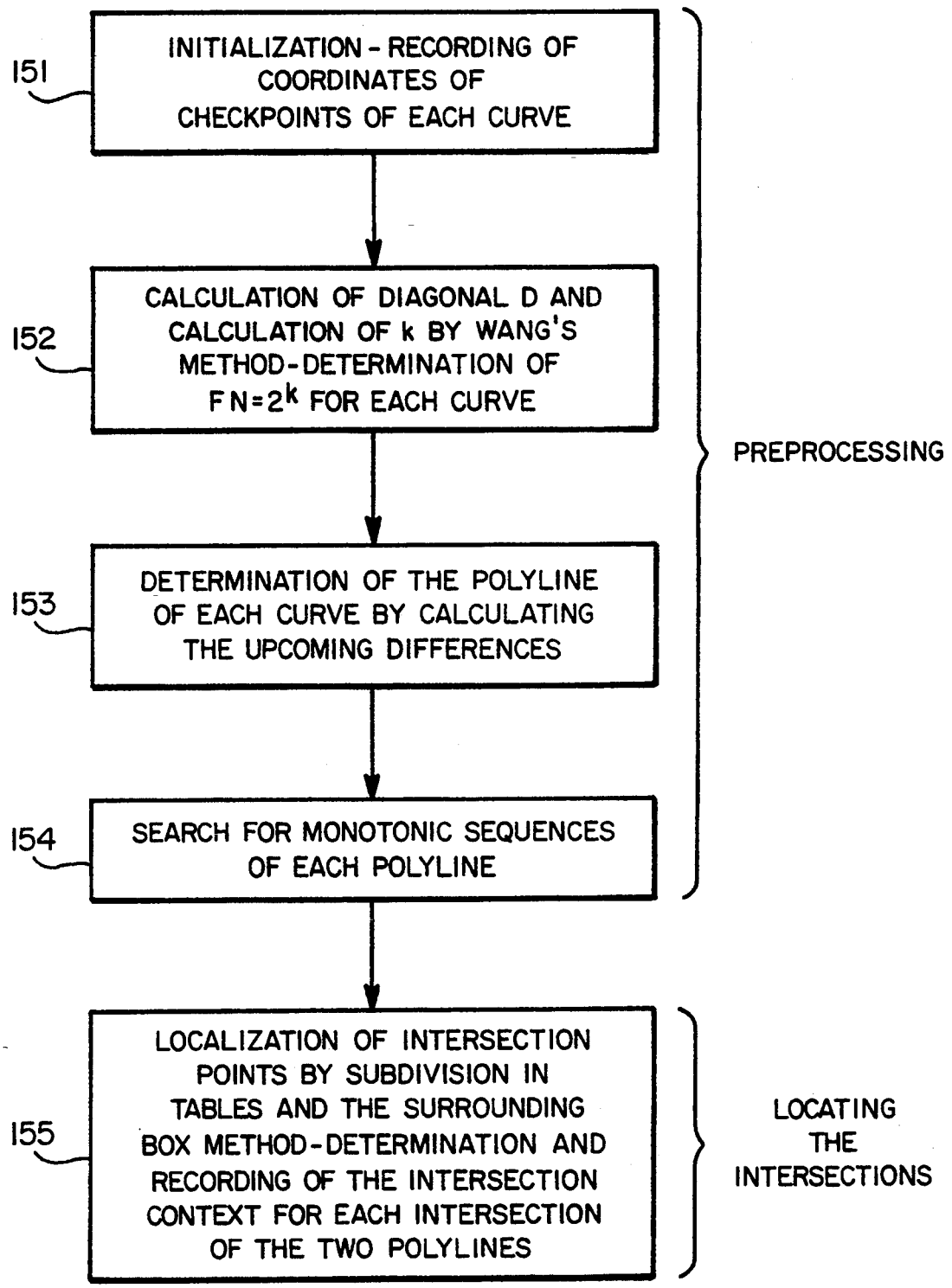
FIG_15

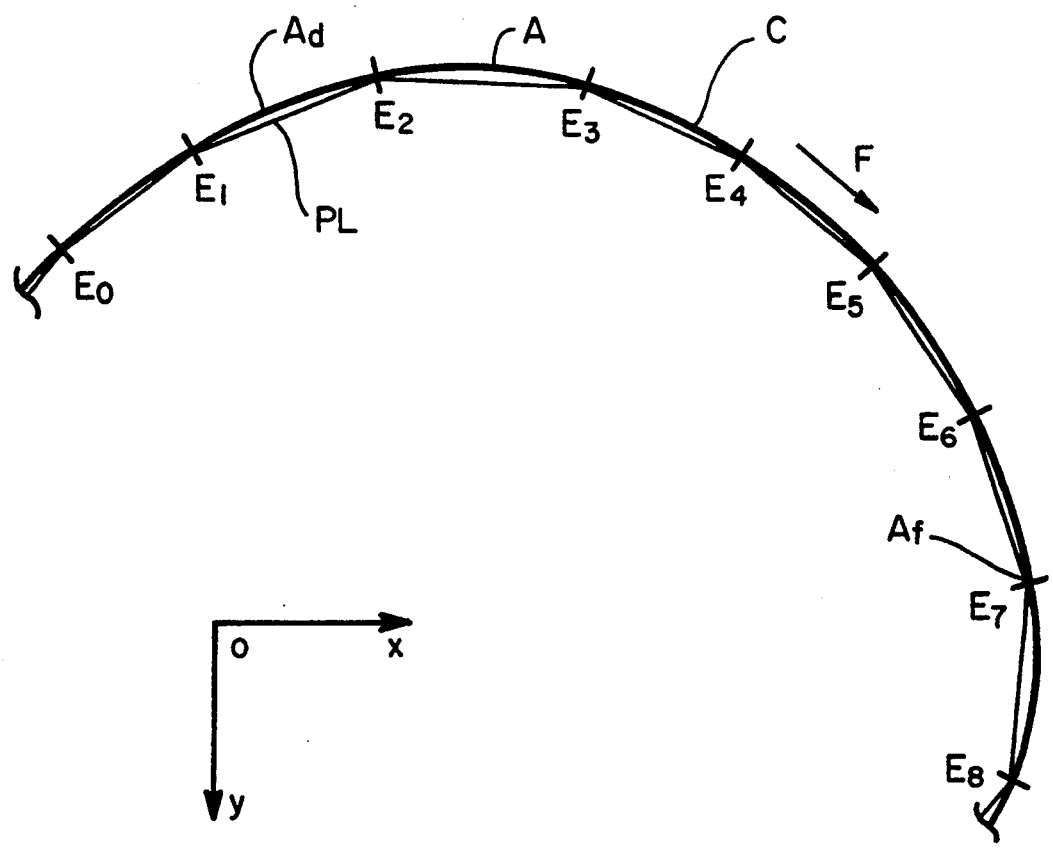
FIG_17
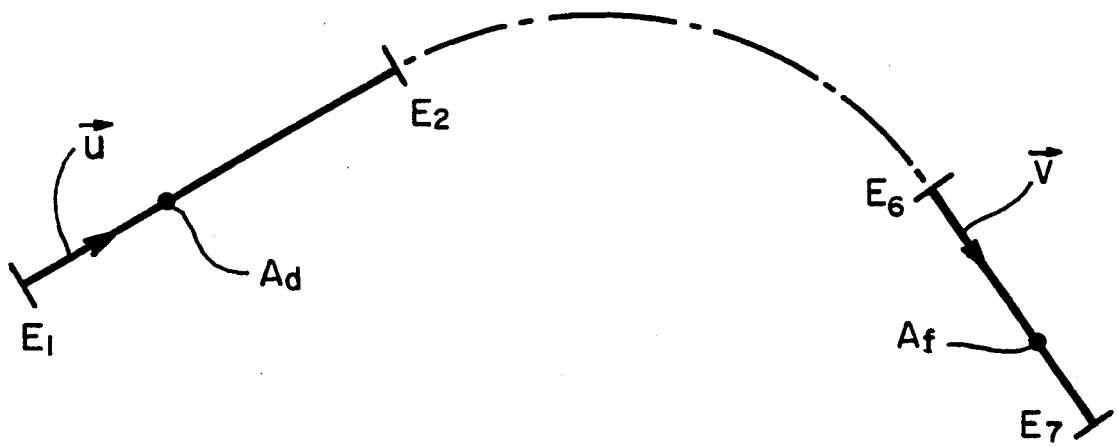
FIG_18

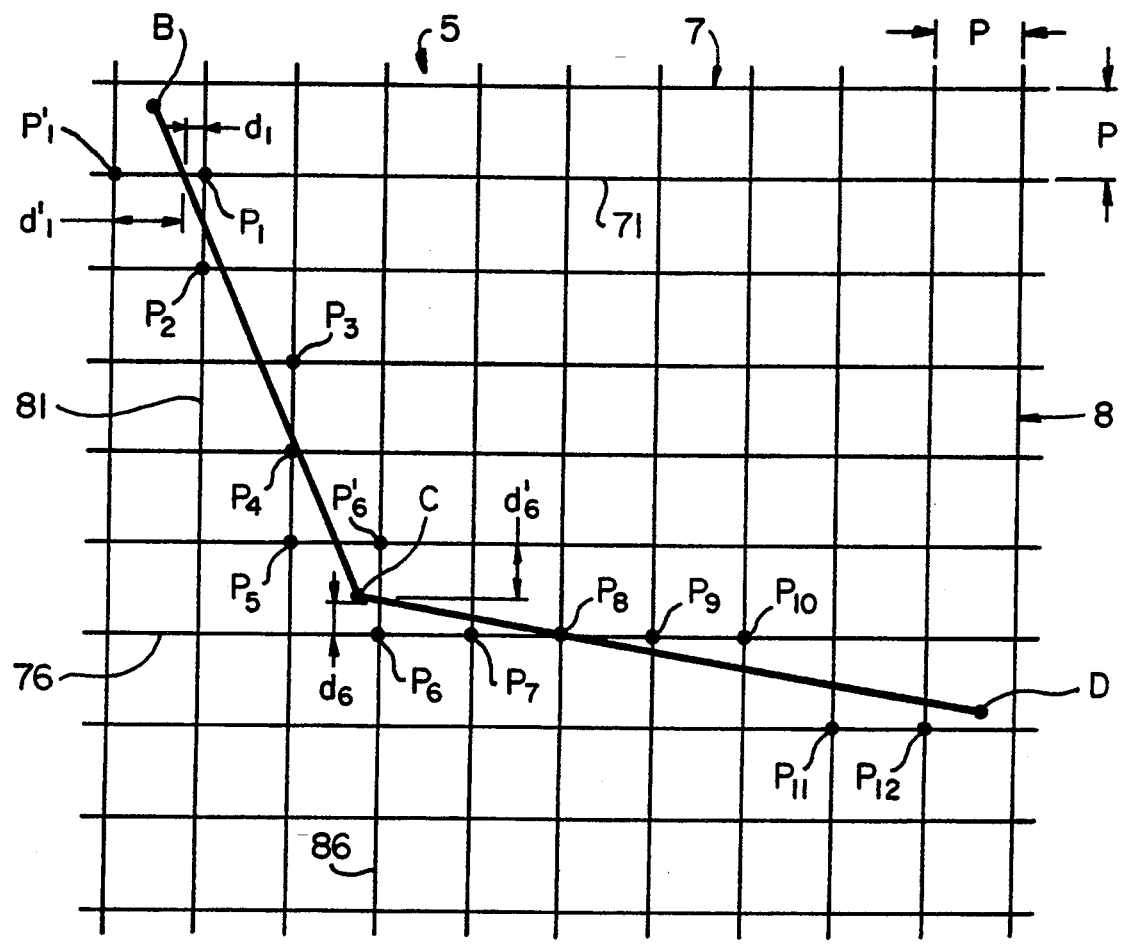
FIG_19
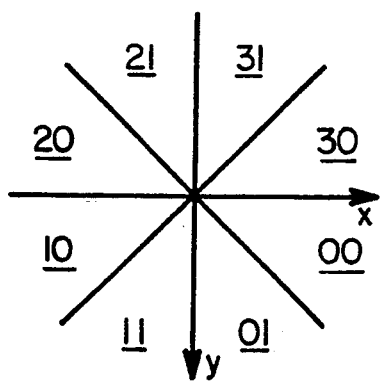
FIG_20

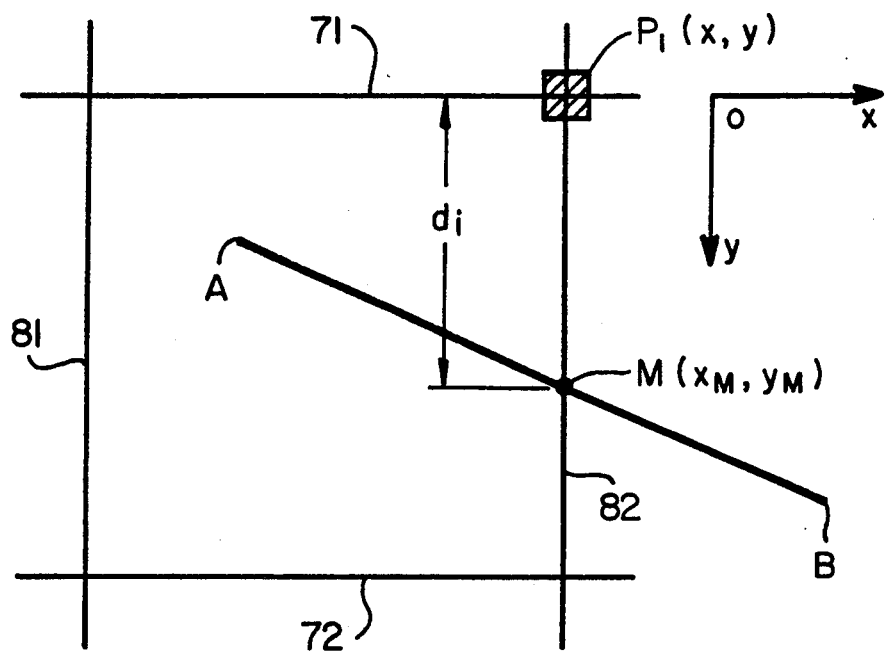
FIG_21
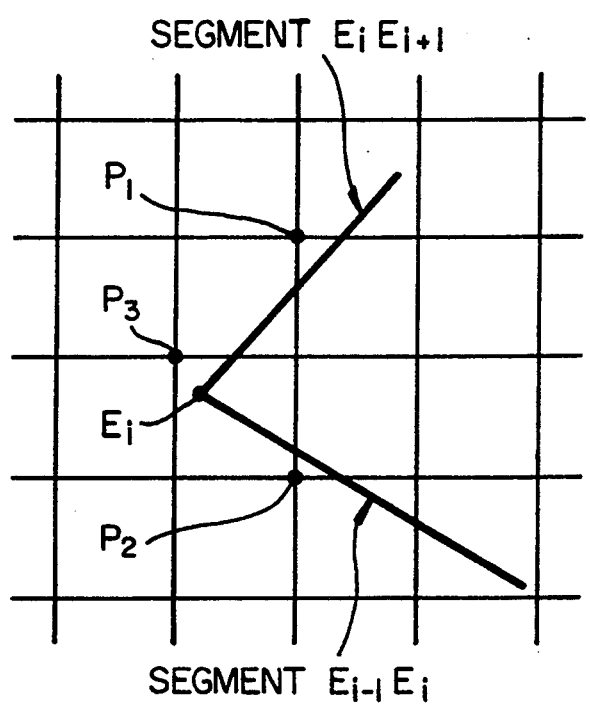
FIG_22

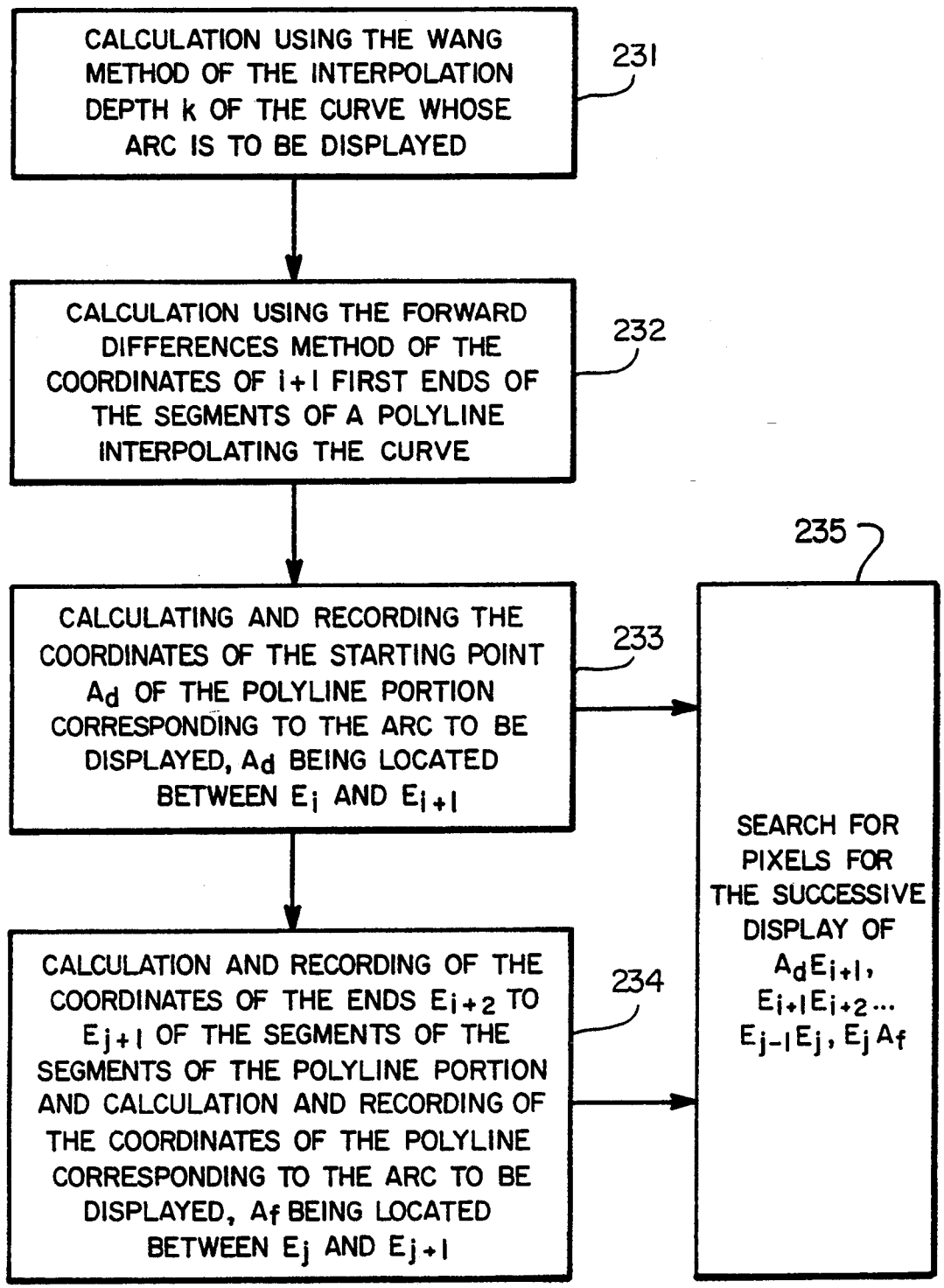
FIG_23

PROCESS AND SYSTEM FOR MAKING COMPUTER-AIDED DRAWINGS USING A CONTOUR INCLUSION TREE ASSOCIATED PLANAR MAP DATA STRUCTURE

This invention pertains generally to a process for making computer-aided drawings and, more particularly, to a process for making computer-aided drawings for applications such as computer-aided engineering (CAE) and computer-aided design (CAD).

Generally speaking, the procedures for making computer-aided drawings are interactive in that they are implemented by an operator using an input peripheral connected to the computer.

Existing techniques for making such drawings have certain limitations and disadvantages such as being limited in the flexibility of the operations they can perform. When, for example, a drawing is made of two orthogonal pairs of parallel lines, it is not possible with existing processes for making computer-aided drawings to see anything other than these four lines if these four lines were defined by the user. It is not possible, for example, to see this drawing as a drawing of a rectangle. The drawing does not have any other formable object than these four lines. It is, therefore, impossible to color the face of the rectangle since the rectangle does not really exist in this specific case.

The invention provides a computer-aided drawing process which overcomes these limitations and disadvantages by forming a drawing in all steps of its implementation in the form of a planar map, and by proceeding iteratively with insertion, erasure, or coloring operations as the drawing is made.

More specifically, the process for creating computer-aided drawings according to the invention includes the following steps:

1) Defining and recording in memory a data structure forming any drawing with all the steps of its creation in the form of a planar map, i.e. a set of faces (F), with each face being delimited by one or more contour(s) carried by curve edges of the drawing and the planar map being associated with a contour inclusion tree;

2) Creating the drawing by performing insertion, erasure, and coloring operations in the initially empty planar map, with the insertion and erasure operations consisting of inserting and/or erasure curves and/or curve elements until the desired drawing is obtained and the coloring operations consisting of coloring one or more faces forming the drawing.

3) Displaying the drawing and proceeding with various update operations.

FIGS. 1a to 1f represent an example of the various steps of the process according to the invention which create the drawing of FIG. 1f;

FIGS. 2a to 2f represent certain steps of the process according to the invention for creating the drawing of FIG. 2f;

FIG. 3 represents a flow chart of the basic steps for implementing the process;

FIGS. 4a and 4b represent, respectively, the scheme of a drawing such as the one described by the planar map according to the invention and a graph representing the tree-like structure of the contour tree corresponding to this drawing;

FIGS. 5a and 5b represent a flow chart representing the basic steps of an insertion operation according to the invention;

FIGS. 6a and 6b represent the step in which the case is determined while updating the contour tree, respectively in the case of an insertion and in the case of a suppression, according to the process of the invention;

FIG. 7 represents an example of a drawing corresponding to each case listed in the table, according to an insertion operation of the invention;

FIG. 8 illustrates a check polygon of a parametric curve C of degree 3, diagonals D1 and D2 of this polygon, and a polyline PL interpolating curve C. Diagonal D is the larger of the two lengths D1 and D2;

FIG. 9 illustrates one polyline portion, in the grid of a frame of reference;

FIG. 10 illustrates two polylines P and Q exhibiting two intersection points 11 and 12 and the surrounding boxes for the monotonic parts of these polylines;

FIG. 11 represents two tables indicating the coordinates of the ends of the segments of each polyline, recorded in memory;

FIG. 12 illustrates surrounding sub-boxes used for locating one of the intersection points of the two polylines;

FIG. 13 illustrates the two surrounding sub-boxes used for determining the two characteristic segments belonging respectively to the two polylines and defining one of the intersection points of the polylines;

FIG. 14 illustrates the two characteristic segments and makes it easier to understand the determination of one of the parameters of an intersection environment of two polylines;

FIG. 15 is a flow chart representing the basic steps of the program implemented for proceeding to the intersections in the process of the invention;

FIG. 16 illustrates a processing system for implementing the display operations according to the invention;

FIG. 17 illustrates a Bezier curve interpolated by a polyline. This curve has an arc to be displayed which one portion of the polyline used for the display corresponds to;

FIG. 18 illustrates two segments containing ends $A_d$ and $A_f$ of the polyline portion corresponding to the arc to be displayed;

FIG. 19 illustrates two segments to be displayed in the pixel grid of the display device;

FIG. 20 illustrates the partition of the display device, into eight octants;

FIG. 21 illustrates one portion of the grid of the display device and makes it easier to understand the selection of a pixel to be displayed;

FIG. 22 illustrates one portion of the grid of the display device, near the junction of two consecutive segments of the polyline portion;

FIG. 23 is a flow chart of the program employed in the process of the invention.

A drawing is made in accordance with the invention by the following steps which are illustrated in FIGS. 1a to 1f and FIGS. 2a to 2f:

1) Defining and recording in memory a data structure forming any drawing with all the steps of its creation in the form of a planar map, i.e. a set of faces (F), with each face being delimited by one or more contour(s) carried by curve edges of the drawing and the planar map being associated with a contour inclusion tree;

2) Creating the drawing by performing insertion, erasure, and coloring operations in the initially empty planar map, with the insertion and erasure operations consisting of inserting and/or erasure curves and/or curve elements until the desired drawing is obtained and the coloring operations consisting of coloring one or more faces forming the drawing.

3) Displaying the drawing and proceeding with various update operations.

A curve insertion operation contains the following steps: acquire the curve using an input peripheral; display the curve on the computer screen; actually insert the curve in the planar map described by the data structure.

An erasure operation of a curve and/or curve element contains the following steps: acquire a point close to the element to be erased using an input peripheral; locate this element in the planar map described by the data structure; depending on the location:

a) erase this element in the planar map,
b) update the contour inclusion tree,
c) erase this element from the display.

A coloring operation of a face consists of the following steps: acquire a point to be located using an input peripheral; locate this point in the planar map described by the data structure; depending on the location:

a) specify the color by reference system in the planar map,
b) show the color during the display.

More specifically, FIGS. 1a to 1f show the development of the steps for the illustration of FIG. 1f. FIG. 1a shows the insertion of a circle 100, FIG. 1b shows the insertion of a straight segment 200 on the circle, FIG. 1c shows the insertion of a second straight segment 300, FIG. 1d shows the erasure of the overhanging ends 200a, 200b, 300a, 300b of line segments 200, 300, FIG. 1e shows the erasure of curve arcs 100a and 100b, and FIG. 1f shows the coloring of face F.

FIGS. 2a to 2f illustrate the various layout steps of a more complex drawing (FIG. 2f) according to the invention.

The flow chart depicted in FIG. 3 allows a computer programmed for this purpose to implement the process according to the invention.

Step 310 is the initialization step of the empty planar map. Step 311 corresponds to four possible choices for the operation, namely: to perform an insertion; to perform an erasure; to perform a coloring; end of drawing.

Step 312 corresponds to the action selected by the operator and steps 313 to 316 correspond to the corresponding operations in the planar map and on the display screen.

The process according to the invention may be implemented with any type of computer, for example a work station from Digital Equipment Corporation programmed for this purpose. The computer has a memory in which the data structure is stored and which describes, in the form of a planar map, the data of any drawing one wants to make with this computer and which may be displayed directly by the computer screen or using a printer regardless of the definition of the printer.

The data structure makes it possible to describe a drawing in both its topological and geometrical form. Any drawing to be laid out by the process is seen in the form of a planar map.

INSERTION (FIGS. 4a-7)

A planar map describes the partition of a plane defined by a finite set of curves. Referring now to FIGS. 4a and 4b, a planar map is defined by the pair (S, A) in which S is a finite set of vertices, each vertex being distinct and in which A is a finite set of edges described by curve arcs having no other intersections than the vertices of the set S.

In the description of the drawing, which is located in memory in the form of a data structure, to each edge correspond two strands that define the two sides of the edge. Two cases may occur: if edge e is incident with two vertices S1 and S2, then the two strands are defined by the pairs (S1, S2) and (S2, S1) respectively; if edge e is incident with only one vertex, then e forms a loop and the two direct and indirect orientations define two strands associated with e.

Moreover, an unempty set of strands is associated with each vertex and this set may be ordered. The strand that follows strand b in the direct order around the incident vertex at b is called a(b). The total order relationship defined by a on the set of incident strands at the same vertex is called a-order. The other strand of the edge associated with b is called w(b).

The two applications a and w mathematically represent permutations of S. A contour may then be described by the set C(b):

$$C(b) = (b, aw(b), \ldots, (aw)^l(b))$$

where l is the smallest natural integer so that $$b = (aw)^{l+1}(b).$$

Knowing a and w, it is simply necessary to know one strand of a contour to obtain the list of strands of this contour. In practice, one will read in memory a strand of a contour and a path of the data structure will make it possible to obtain the strand list of this contour.

It is also recalled that a tree-like structure is associated with the structure of a planar map. This tree-like structure defines a partial order of inclusion relationship of the connected components formed by the edges. The tree-like structure is called inclusion tree of the contours (FIG. 4b).

The root of the tree is a virtual internal contour c which describes the infinite face of the plane. The sons of an internal contour are the external contours of the connecting components contained in this internal contour ($E_1$ and $E_3$ in FIG. 4a). The sons of an external contour are the connecting internal contours of the same component (c1, c2, c3 in FIG. 4a).

In this tree, a face is described by an internal contour and possibly by the set of its external son contours. A connecting component is described by an external contour and possibly by the set of its internal connecting son contours.

Accordingly, the leaves of the contour tree are either internal contours not containing any connecting component, or external contours without any internal son contour.

The inclusion tree produces a good illustration of the partition of the plane and is therefore used to obtain the boundary contours of a face, to obtain the connecting components, to locate a point, etc.

Accordingly, in the process according to the invention, the planar map which is described in a data structure is not limited to straight segments. Said structure is divided, according to the process of the invention, into two distinct parts: a geometric data structure and a topological data structure.

According to the invention, in the geometric data structure: a curve is described by a check polygon and an ordered series of arcs; the orientation of a curve is given by the order of its checkpoints; an arc is a curve portion delimited by two points, the orientation of an arc is given by the order of the parameters of its end points; the arcs project on the edges; a point is reference system by a curvilinear parameter on a curve.

A point may be an end point of a curve, a self-intersecting point of a curve, or an intersecting point between two curves. The points project on the vertices.

It is recalled that the topological data structure includes data representing strands, vertices, edges, and contours.

According to the invention, in the topological data structure: a strand b is described by strand a(b), strand w(b), the vertex around which strand b is incident, the edge with which stand b is associated, and the contour to which strand b belongs; a vertex s is described by Cartesian coordinates in a space limited from the beginning and called a grid, and by incident strand b around this vertex s.

This strand makes it possible to obtain the list of incident strands at s.

an edge e is described by the list of intermingled arcs produced by this edge e and by strand b of e. The other strand of e is obtained by the relation w(b).

a contour c is described by strand b belonging to this contour c and by links sic father, son, and brother contours of c used to cross the contour inclusion tree.

The description of a planar map consists of providing a topological data structure in which fields are provided to receive data corresponding to contours, data corresponding to vertices, data corresponding to edges, and data corresponding to strands.

It also consists of providing a geometric data structure in which fields are provided to receive points linking with a vertex, arcs linking with an edge, data corresponding to strands attached to arcs. These strands are links between the geometric structure and the topological data structure.

FIG. 5a represents a flow chart in which blocks drawn in dotted lines represent the basic steps of an insertion operation according to the invention. The first block I relates to the initialization step, the second block II relates to the intersection calculation step, the third block III relates to the updating step and the fourth block IV relates to the iteration step.

The first processing of the curve to be inserted consists of modelizing the curve by transforming it into the form of a Bezier curve, then by interpolating using de Casteljau's process. Preferably, the process used is the process which is described hereinafter in connection with curve intersection. This first processing takes place upstream from initialization step I.

The preliminary initialization step consists primarily of assigning to the curve to be inserted a parameter $t_i t_o$ for which to corresponds to the origin $P_o$ of the curve. Parameter $t_n$ corresponds to the other end of the curve.

This initialization step I also consists of locating the face of the planar map in which the origin of the curve to be inserted is found, and whose parameter is $t_o$ (block 20), and of storing face F in which this origin is found (block 24).

Intersection step II (blocks 30, 32) consists of finding all self-intersecting points of the curve to be inserted, then the points where the curve to be inserted intersects with the curves formed by the edges of the contours of this first identified face.

The updating step III (blocks 50, 51) consists, in the case of insertion, of inserting the first arc found with parameters $(t_i, t_{i+1})$. At the first iteration $t_i$ is the origin of the curve. This step also consists of updating the contour inclusion tree (block 51).

Step IV consists of performing an iteration of parameter $t_n$ and insofar as $t_i$ is not equal to $t_n$, of passing from the face including the arc defined by parameters $(t_i, t_{i+1})$, to "the next adjacent face and restarting each step from step II.

In a more detailed manner, in initialization step I, it is necessary to find which face F belongs to point $P_o$ of parameter to of the curve C to be inserted (block 20). The process therefore advantageously consists of fictitiously inserting a straight line $D_o$ whose origin is this point $P_o$ and whose end is known point $P_e$, located outside a rectangle containing the planar map. Point $P_e$ therefore belongs to the qualified face of infinite face $F_i$.

The half line is inserted fictitiously, i.e. it is only used to calculate the intersections and is not used to update the planar map. The principle of locating the origin of the curve to be inserted consists of looking for edge e so that the distance between the intersection of edges $e_i$ with straight line $D_o$ and point $P_o$ is minimal. At the beginning the current point is point $P_e$, this point being located in infinite face $F_i$.

To obtain edge e in an optimum manner, the adjacent faces form a path step by step from point $P_e$ to point $P_o$ along straight line $D_o$, the last intersection found being the closest one.

This path consists of determining the intersection points between the straight line and each of the faces using the contour tree. A special process which makes it possible to determine the intersections between two curves is described below.

Face F which point $P_o$ belongs to is stored. If no intersection is determined, the infinite face $F_i$ (block 24) is stored.

Two special cases may occur: the point to be located $P_o$ is found on a vertex or on an edge of the map. If the point is found on a vertex, the a-order is used at this vertex to determine the face containing the incident strand at $P_o$. If the point is found on an edge e, the a-order is used at the vertex (associated with $P_o$) newly created by dividing edge e.

The parameter $t_i$ for point $P_o$ corresponds to parameter $t_o$.

The intersection step II has sub-step 30 which consists of comparing an arc $a_i$, defined by parameters $(t_i, t_n)$ in the case $(t_o, t_n)$, during the first iteration, with all curves of face F.

To accomplish this, the intersections between arc $a_i$ of parameters $(t_i, t_n)$, i.e. the entire curve at the first iteration, and all curves produced by the edges of the contour of face F are determined.

The intersection point closest to the starting point, i.e. $P_o$ in the first iteration, defines a first arc of parameters $(t_i, t_{i+1})$, which will be inserted in the face considered here (block 32).

The updating step III therefore has insertion sub-step (50) of arc $(t_i, t_{i+1})$, current in the face considered here, i.e. F for the first arc.

Then in iteration step IV, an iteration is performed of parameter $t_i$ which becomes parameter $t_{i+1}$ after first comparing $t_{i+1}$ with $t_n$, i.e after verifying that the end $P_n$ of the curve (block 70) is not reached.

In the case of end $P_n$ of the curve, the insertion process is completed.

Otherwise, one passes from the face in which an arc was just inserted to the adjacent face (block 71) and starts all over again in intersection step II, i.e. to compare arc $(t_i, t_n)$, i being incremented, with all curves of the new face not yet intersected.

Sub-step (31) for comparison of arc $(t_i, t_n)$ with all other curves of the current face will now be described in more detail. This step includes an intersection calculation step.

If C is the curve to be inserted and B a curve of the current face, by determining the intersection points it is possible to obtain for each intersection between curve and curve B an intersection context containing:

parameters $t_C$ and $t_B$ of intersection points $P_C$ and $P_B$ on C and B, the $a_{CB}$ a-order of strands C and B, around intersection points of C and B.

The intersecting contexts are calculated using the process described below. The intersections are then updated in the planar map.

For each intersection found between the new curve to be inserted and curve B of the current face, the a-orders of the map are updated around the intersecting points found:

1) given set $(t_C, P_C, t_B, P_B, a_{CB})$, the intersection context obtained by the step allowing the intersections to be determined,
2) If $P_B$ is not a point of B:
   a) divide edge e producing the arc containing $t_B$,
   b) divide B into $t_B$ and all arcs produced by e,
3) If PC is not a point of C, divide C into $t_C$,
4) given s the vertex on which $P_o$ and $P_C$, are projected, merge the a-order of the vertex s and a-order $a_{CB}$.

The a-order is updated on each intersecting vertex found by inserting the intersection strands of C and B if they do not already exist, in which case the arcs share the same strands. To update the a-order of the strands around these vertices, the slope of the intersecting chords are used was described in the previously referenced application.

All intersecting strands not existing around an intersecting vertex are inserted, including those of the new curve C. These make it possible to obtain face F containing arc $a_{i+1}$ using the face associated with the contour attached to strand a-(b), where b is the first strand of arc $a_{i+1}$.

The current face F is marked during this substep. This is preferably accomplished by reserving a field in the face coding so as to contain this field after determining the intersections between the parametered curve arc $(t_i, t_n)$ and the face.

Insertion substep 50 of the arc of parameters $(t_i, t_{i+1})$ in a face F can now be described in greater detail as follows.

After searching for all intersections between new curve C and face F and updating the a-orders around these intersections, arc $a_i$ is inserted in the map. At this step of the process, $a_i$ intersects the map the closest to its ends points $(P_i, P_{i+1})$.

While inserting arc $a_i$, the following is created: a vertex for each $a_i$ strand if this vertex does not already exist in the map. Otherwise the curve arc has one of its end points projecting on a vertex of the map, an edge if it does not already exist in the map. Otherwise, arc $a_i$ projects on an existing edge, which means that there is an overlapping of arcs.

If the edge producing arc $a_i$ does not exist, the contour tree is updated with this edge.

In the updating step III, after inserting arc $(t_i, t_{i+1})$, an updating substep (51) of the contour inclusion tree is performed. In this case, this consists of modifying the tree to account for the new edge.

In describing substep 51, the following terminology is employed:

A vertex is a hanging vertex if and only if one and only one edge is incident to this vertex.

An edge e is a hanging edge if and only if its two strands b and w(b) belong to the same contour. Otherwise e is a separating edge.

Three types of hanging edges are distinguished according to the number of hanging vertices of this edge:

a connecting edge is a hanging edge that has no hanging vertices, a terminal edge is a hanging edge of which one and only one of the vertices is hanging, an isolated edge is a hanging edge two of the vertices of which are hanging.

An edge of which 2 vertices are indistinguishable is a loop. A loop whose vertex is of degree 2 is an isolated loop.

In the process according to the invention, eight possible cases have been listed for an edge in this planar map. These eight cases are placed in a memory table (FIG. 7).

Case 1 The edge is a terminal edge the two strands of which are incident with an internal contour, marked $C_i$, Case 2 The edge is a connecting edge the two strands of which are incident with one internal contour $C_i$, Case 3 The edge is a separating edge the two strands of which are incident with two distinct internal contours $C_i$ and $C'_i$, Case 4 The edge is a separating edge one strand of which is incident with an internal contour $C_i$ and the other strand is incident with an external contour $C_e$, Case 5 The edge is an isolated edge, Case 6 The edge is a terminal edge the two strands of which are incident with an external contour $C_e$, Case 7 The edge is a connecting edge the two strands of which are incident with an external contour $C_e$, Case 8 The edge is an isolated loop.

In practice the updating of the contour tree while an edge is being inserted actively consists of:

1. Determining the case, which provides the contour(s) to be updated in the inclusion tree,
2. The actual updating of the contour inclusion tree per se. To determine the case of the edge, refer to the diagram of FIG. 6a (blocks 510-519):

The contour tree is updated after inserting each edge in the map. Accordingly, the strands, edge vertices, and a-order around these vertices are up to date before updating the contour tree.

The contours $C_o$, $C_1$ to which belong the strands adjacent to the strands of e (a-(b) and aw(b) with b=one strand of e), may be consulted. The type (internal or external) of these contours, associated with the number of hanging vertices of the edge e to be inserted make it possible to determine the case of this edge.

Table 1 below summarizes how to determine the case of the edge e to be inserted e b being strand of e.

TABLE 1

| Number of Hanging Vertices (block 511) | Old Contours ($C_0$, $C_1$) | Case |
|---|---|---|
| 0 | identical internal contours | 3 |
| (block 512) | identical external contours | 4 |
|  | internal and external contours | 2 |
|  | distinct external contours | 7 |
|  | none | 8 |
| 1 | internal contour | 1 |
| (block 517) | external contour | 6 |
| 2 | not applicable | 5 |

For the updating per se:

When two contours are merged into one, one contour is suppressed from the inclusion tree, the remaining contour inherits the strands and contours from the suppressed contour.

When a contour is divided into two, one contour is created, this contour becomes the son or brother of the divided contour. The descendant contours of the divided contour are shared between the two contours: their ascendant is determined by locating it (as performed for the origin $P_o$).

Cases 1 and 6 (terminal edge) do not result in a modification of the contour tree.

For Case 2

An internal contour and an external contour are merged into an internal contour. The sons of the external contour become brothers of the internal contour. The external one is suppressed from the contour tree.

For Case 3

An internal contour is divided into two internal contours; the internal contour created becomes the brother of the divided contour. Some sons of the divided contour become sons of the created contour.

For Case 4

An external contour is divided into an external and internal contour. The internal contour created becomes the son of the external contour. Some of the brothers of the external contour become sons of the contour created.

For Case 5

An external contour is created. Its internal father is determined by locating the origin of the inserted curve (result of the locating process).

For Case 7

Two external contours are merged into one external contour. One external contour is suppressed from the contour tree. The sons of the suppressed contour become sons of the external contour resulting from the merger.

For Case 8

An external contour and internal contour are created. The internal contour created becomes the son of the external contour. The father of the external contour is determined by locating the vertex of the loop (result of the locating process). Some sons of the father of the external contour become sons of the internal contour created.

The updating of the contour tree will now be described for the case of the suppression of an edge.

As for the insertion, the updating is composed of two steps:

1. Determining the case of the edge to be suppressed,

2. Updating the contour tree as a function of the edge case.

To determine the case of the edge, refer to FIG. 6b (blocks 610–619):

In the case of an edge suppression, the updating is performed before the edge is suppressed. The number of hanging vertices of the edge (block 611) and the type (internal or external) which the edge strands belong to are therefore known.

Table 2 below summarizes how the case of edge e to be suppressed is determined, b being a strand of edge e.

TABLE 2

| Number of Hanging Vertices (Block 611) | Incident Contours ($C_0$, $C_1$) | Case |
|---|---|---|
| 0 | identical internal contours | 2 |
| (block 612) | identical external contours | 7 |
|  | internal and external contour | 4 |
|  | distinct internal contours | 3 |
|  | internal and external contours | 8 |
| 1 | internal contour | 1 |
| (block 617) | external contour | 6 |
| 2 | not applicable | 5 |

If the comparison block 615 leads to case 4, at least one of contours $C_o$ or $C_1$ contains more than one strand.

If the comparison block 615 leads to case 8, the two contours $C_o$ and $C_1$ only contain one strand.

For the updating per se:

Cases 1 and 6 (terminal edge) do not modify the contour tree.

For Case 2

An internal contour is divided into an internal contour and external contour. The external contour created will be the son of the internal contour. Some contours which were brothers of the internal contour become sons of the external contour created.

For Case 3

Two internal contours are merged into one internal contour and the external sons of each of the two contours are merged.

For Case 4

One internal contour and one external contour are merged into an external contour. The son contours of the internal contour become brothers of the external contour.

For Case 5

One external contour is suppressed.

For Case 7

One external contour is divided into two external contours. Some sons of the divided external contour become sons of the created contour.

For Case 8

One external contour and one internal contour are suppressed. The son contours of the suppressed internal contour become sons of the father of the suppressed external contour.

ERASURE (FIGS. 5b, 7)

According to the invention, during a suppression operation, the elements of the geometric data structure are never suppressed, but they are marked erased. Conversely, the elements of the topological data structure, vertices, edges, and contours, may be suppressed. The contour tree is updated.

The process makes it possible to erase the following objects: one edge, one curve, one related component, or the hanging edges of a contour, a face, a component, or of an entire map. The erasure step includes steps V and VI of FIG. 5b. The object to be erased is first located in the map (V) by locating all of its edges e (blocks 40, 41). Then an updating operation is performed (VI) consisting of performing an erasure operation per se and updating the contour tree (block 60).

To erase a curve means to mark the arcs of this curve "erased", and to remove these arcs from the edges which produce them. If the edges no longer produce arcs, they are suppressed: their strands are removed from the a-order of the vertices around which they were incident, and their vertices are suppressed if they have no more incident strands.

Accordingly, to erase a component means to erase all the edges of this component. In order to avoid any undesired creation of a related component, the component will not be erased edge by edge.

The applicant has noticed that only the connecting edges (cases 2 and 7) produce a second component (by dividing the first one) when they are erased. No other cases produce any. In particular, the edges of case 4 produce none, and a component which does not contain edges of case 4 or is not reduced to an edge of case 8 is a hanging external contour (contour consisting of an edge of case 5 or edges of cases 6 and 7). Such a component may be erased by erasure of its hanging edges.

The following steps are then performed:
1. Erasure of all edges of case 4 (if they exist).
2. Erasure of all hanging edges of the component (if they exist).
3. Erasure of the edge of case 8 (if it exists).

For step 1: the external contour of the component is covered, actually all edges of case 4 (if they exist) are found on this contour.

If there are no edges of case 4 to be suppressed, this means that the component is a hanging external contour or is reduced to an edge of case 8.

For step 2: if the component is not an edge of case 8, it is then simply necessary to suppress the hanging edges of this component.

For step 3: suppress the edge of case 8.

Accordingly, to erase the hanging edges of a contour, a face, a component or a map, the hanging edges are advantageously erased by recursively suppressing the hanging tree-like leaves. To accomplish this, the object to be erased is covered by searching for an edge, for which at least one vertex is hanging (terminal or isolated edge). If the unchanging vertex of the edge becomes hanging after a terminal edge is suppressed, then the incident edge at this vertex becomes terminal. This process is then reiterated by following the terminal edges through the hanging vertices.

In practice, the following steps are implemented:
A. Search for an edge e for which at least one vertex is hanging (if none exist there is no more hanging edge),
B. if e exists:
   (a) keep the unchanging vertex s of e,
   (b) suppress edge e,
   (c) if s becomes hanging after step B(b), reiterate B(a) with edge e=edge incident on s,
   (d) reiterate A.

COLORING

To fill, i.e. to color a face, the steps relative to the display according to the invention are applied. These steps are explained hereinafter in connection with the display. The locating of a point given by the user is performed as described hereinbefore.

The following description gives a special embodiment mode to determine the curve intersections according to the invention.

INTERSECTION (FIGS. 8–15)

The curves for which the intersection points are to be determined are not obtained directly, but rather by interpolation by straight segments having ends located on these curves. For each curve, these successive straight segments form a polyline. The selection of the parameters which define these polylines is especially important since they determine how good the representation of each curve is. Also, to determine the intersection points of the two curves, the intersection points of the two polylines interpolating these two curves, respectively, are determined.

Among the known methods that may serve to develop the polylines of a curve, the best-performing one is the "de Casteljau" method, described in particular in the work "Forms With Poles" by Paul de Faget de Casteljau—volume 2 of "Mathematiques et CAO'-'—Hermes 1985. This method consists of considering that any polynomial parametric curve of degree d may be expressed in the form of a polynomial Bezier curve. The Bezier curves are described in particular in the work "Curves and Surfaces" by P. Bezier—Mathematiques et CAO—Volume 4—Hermes 1986. From these documents, it is known that a polynomial parametric curve of degree d, mathematically described by the vectorial function $U(t)=(x(t), y(t))$, with $0 \leq t \leq 1$ may be defined by $d+1$ successive Bezier points $U_0$, $U_1, U_2, \ldots, U_d$ so that:

$$U(t) = \sum_{i=0}^{d} U_i B_{i,d}(t)$$

In this relation $U_i$ represents the Bezier points, and $B_{i,d(t)}$ are the Bernstein polynomials which are in particular described in document [2] above, as well as in the following documents:

"Numerical control: Mathematics and applications" Wiley and Sons Ltd. 1972 by P. Bezier.

J. Lane and R. Riesenfeld. "A Theoretical Development for the Computer Generation and Display of Piecewise Polynomial Surfaces." IEEE Transaction on Pattern Analysis and Machine Intelligence, vol. 2(1): 35–46, 1980.

L. Ramshaw. Blossoming: A Connect-the-Dots Approach to Splines. Research Report=/19, Digital Equipment Systems Research Center, Palo Alto, 1987.

The successive points $U_0, U_1, \ldots, U_d$ are called checkpoints, whereas the polygon defined by points $U_0$, $U_1, U_d, U_0$, considered in this order, is called a check polygon. Each checkpoint $U_i$ may be located using real coordinates $(x_i, Y_i)$ in a frame of reference. These real coordinates are recorded in the computer memory.

The "de Casteljau" method makes it possible to specifically obtain the interpolation polyline of a Bezier curve. A polyline is formed of N successive segments, making it possible to represent this curve in more detail.

The "de Casteljau" method is a method which is used to interpolate a Bezier curve using a polyline obtained with a recursive-type subdivision. According to one variant of this method the curve is first interpolated by a polyline with two segments (interpolation depth k=1), then by a polyline with four segments (k=2), and so forth, to meet the following "proximity criterion" each segment of the polyline is not farther away than one grid unit of the curve portion it interpolates. The grid unit is the unit which is selected in the frame of reference.

This method gives a good representation of a Bezier curve using an interpolation recursive representation. The number N of segments of a polyline is associated with the interpolation depth k by the relationship $N=2^k$.

Authors, and in particular G. Wang, showed that the interpolation depth k, when it meets the preceding proximity criterion, is given by the relation:

$$k = \left\lceil Log_4 \frac{d(d-1)D}{8} \right\rceil$$

in which d is the degree of the curve and D the diagonal of the check polygon of the curve. This diagonal will be described in more detail below.

The "de Casteljau" interpolation method will be more clearly understood with the aid of the description of FIG. 8. This figure illustrates a Bezier curve, of degree d=3, for example, whose check polygon PC is defined by d+1=4 checkpoints U0, U1, U2, and U3 of coordinates $(x_0, Y_0)$, $(x_1, Y_1)$, $(x_2, Y_2)$, $(x_{32}, y_3)$, measured in a frame of reference (o, x, y); these coordinates are recorded in the memory of a computer.

This curve may be interpolated by a polyline, according to the "de Casteljau" method which will not be described here in detail. The polyline PL has N=4 segments in the example shown. The interpolation depth k required for obtaining this polyline is here equal to 2, since $N=2^k=4$.

The two diagonals D1 and D2 of the check polygon PC are also shown in this figure.

According to a preferred embodiment, to determine the intersections of two curves, the respective polylines of these curves are first determined, and to accomplish this, for each curve, the interpolation depth k is calculated by the Wang formula:

$$k = \left\lceil Log_4 \frac{d(d-1)D}{8} \right\rceil$$

in order to calculate the number $N=2^k$ of segments of each polyline.

As indicated above, to calculate k, it is necessary to seek among the values of the lengths of diagonals D1 and D2 (in the example shown in FIG. 8) of the check polygon, the maximum value D. This search is easy for each curve, since the coordinates of the checkpoints of the check polygon of each curve are known and are recorded in memory.

The knowledge of each N value then allows each elementary step $(dx_0, dy_0)$ to be known which makes it possible, in particular, to pass from each first coordinate end $(x_0, Y_0)$ of the first segment S1 of each polyline to the second end of coordinate $(x_1, Y_1)$ of this segment.

This second end of the first segment S1 corresponds to the first end of the next segment S2 of the polyline.

Generally speaking, the coordinates $(x_{i+1}, Y_{i+1})$ of the segment ends of each polyline are calculated recursively by the computer, by first evaluating the steps $(dx_i, dy_i)$ that should be added respectively to coordinates $(x_i, Y_i)$ of the end of a segment, to pass to coordinates $(x_{i+1}, Y_{i+1})$ of the end of the next segment on the polyline.

This calculation may be called "forward step" or "forward differences" calculation. The recursion calculation is established as follows:

$$x_{i+1} = X_i + dx_i \text{ and } y_{i+1} = y_i + dy_i$$
$$\text{with } dx_{i+1} = dx_i + d^2x_i \text{ with } dy_{i+1} = dy_i + d^2y_i$$
$$d^2x_{i+1} = d^2x_i + d^3x_i \; d^2y_{i+1} = d^2y_i + d^3y_i$$
$$| \quad | \quad | \quad |$$
$$dd - 1x_{i+1} = dd - 1x_i + dd x_i \; dd - 1y_{i+1} = dd - 1y_i + dd y_i,$$

With the initialization i=0, then:

$$x_1 = x_0 + dx_0 \text{ and } dY_0$$

d-$x_0$ and d-$Y_0$ are the coordinates of the first checkpoint U0. Since the number N of segments of the polyline are known, it is then possible to calculate by recursion and a priori, the differences d−$x_1$ = $Sx_0$ + $d^2x_0$ and d−$Y_1$ = -d−$Y_0$ + $d^2Y_0$ and so on until $d^d x_{i+1}$ and $d^d Y_{i+1}$, $dx_0$ and $dy_0$, $d^2x_0$ and $d2Y_0$, ..., $d^d x_0$ and $d^d x_{i+1}$ are initialized from the checkpoint coordinates of degree d of the curve and of the interpolation depth k.

Since these calculations of the end coordinates of the segments of each polyline of each curve are performed, and these coordinates are recorded in memory in their calculation order (for $0 \leq i \leq N$), the intersections of the two curves are then searched for. Each intersection point is searched for from two characteristic segments belonging respectively to the two curves and intersecting the desired point. The search for these two characteristic segments is moreover another important aspect of the invention.

Before searching for the intersection points, as will be seen below in more detail, the calculated coordinates of the segment ends of each polyline of each curve are reduced to whole values. These whole values correspond respectively to the whole coordinates of the points of grid G of the frame of reference (0,x,y), respectively the closest to the segment ends of each polyline. These whole values of the end coordinates of the segments are recorded in memory.

FIG. 9 shows grid G in reference system (0,x,y) of step p equal to one. Two segments S1 and S2 of a polyline of a curve are illustrated as an example. Said curve is obtained according to the process of the invention. These segments have ends that have, respectively, the coordinates $((x_0, Y_0), (x_1, y_1))$ and $((x_1, y_1), (x_2, y_2))$.

The values of the coordinates $(x_0, y_0)$ of the first end of segment S1 are reduced to the closest whole values, i.e. to the whole values corresponding to the intersection point G1 of grid G, the closest to this first end. Similarly, the values of coordinates $(x_1, y_1)$ are reduced to whole values of the coordinates of point G2 of the grid, the closest to the end of coordinates $(x_1, y_1)$. The same is true for the end of coordinates $(x_2, y_2)$ whose values are reduced to the whole values of the coordinates of the closest point G3 of the grid.

FIG. 10 illustrates as an example two polylines P and Q, respectively interpolating two Bezier curves, not shown, whose two intersection points are searched for. The search for these intersection points is reduced to the search for two intersection points $I_1$ and $I_2$ of the polylines which correspond to them. It is assumed that the intersections are transverse, but the explanations which follow remain valid for curves exhibiting non-transverse intersections, i.e. partially overlapping curves.

It is assumed, for example, that each polyline has eight segments here: $P_0P_1$, $P_1P_2$, ..., $P_7P_8$, for the polyline P, and $Q_0Q_1$, $Q_1Q_2$, ..., $Q_7Q_8$, for the polyline Q. The coordinates $(x_0, y_0)$, $(x_1, y_1)$ ..., $(x'_8, y'_8)$ and $(x'_0, y'_0)$, $(x'_1, y'_1)$, ..., $(x'_8, y'_8)$ of the ends $P_0$, $P_1$, ... , $P_8$ and $Q_0$, $Q_1$, ..., $Q_8$ of these segments, are recorded in memory in their calculation order; the marking index i of each end $P_i$ or $Q_i$ ranging here from 0 to 8, as illustrated in Tables A and B of FIG. 11, relative to polylines P and Q, respectively.

FIGS. 11 and 12 will now make it possible to more clearly understand the search for each intersection point between two curves, from the polylines intersecting these curves, respectively.

The recording in memory of the coordinates of the ends $P_o$, $P_1$, ..., $P_8$ and $Q_0$, $Q_1$, ..., $Q_8$ of the polyline segments P and Q, is illustrated by Tables A and B of FIG. 11. From Table A, it is seen that the ends $P_o$, $P_1$, ..., $P_8$ of the segments of the polyline P, of respective coordinates $(x_0, y_0)$, $(x_1, y_1)$, ..., $(x_8, y_8)$, are recorded in memory in their chronological calculation order, from the first end $P_0$ of the first segment, to the second end $P_8$ of the last segment. The index i of these ends is here between 0 and N=8.

The same is true for coordinates $(x'_0, y'_0)$, $(x'_1, y'_1)$, $(x'_8, y'_8)$ of ends $Q_0$, $Q_1$, ..., $Q_8$ of the segments of polyline Q, as illustrated in Table B of FIG. 11.

According to the preferred embodiment, the monotonic sequences of whole values (in x and in y) are searched for in, the polyline of each curve, from the whole values of the end coordinates recorded in memory of the segments of this polyline. Each monotonic sequence corresponds to a succession of segments delimited by a first end of the first end segment and by the second end of an end segment.

In the example depicted in FIG. 10, polyline P, interpolating one of the curves, has the first monotonic sequence in the values of the coordinates of ends P, $P_1$, $P_2$, $P_3$, $P_4$ of the segments of this polyline, (increasing x and y values), and a second monotonic sequence in the values of the coordinates of ends $P_4$, $P_5$, $P_6$, $P_7$, $P_8$ of other segments of this polyline (increasing x values and decreasing y values). These first and second monotonic sequences for polyline P, are represented by M1 and M2 in table A of FIG. 11. The coordinates of the segment ends of sequences M1 and M2 form subtables of Table A.

Similarly, for polyline Q interpolating the other curve, the first monotonic sequence is distinguished by the values of the coordinates of ends $Q_0$, $Q_1$, $Q_2$, $Q_3$, $Q_4$ and a second monotonic sequence in the values of end coordinates $Q_4$, $Q_5$, $Q_6$, $Q_7$, $Q_8$ of the segments of this polyline. These two monotonic sequences are called M'1 and M'2 in Table B of FIG. 11. The coordinates of the segment ends of sequences M'1 and M'2 form subtables of Table B.

It is seen in these figures that each sequence is delimited by the coordinates of the first end of the first segment of the sequence (first end segment of the sequence), and by the coordinates of the second end of the last segment of the sequence (second end segment of the sequence). Accordingly, sequence M1 is delimited by coordinates $(x_0, y_0)$ of the first end $P_0$ of the first segment $P_0P_1$ of this sequence, and by coordinates $(x_8, Y_8)$ of the second end $P_8$ of the last segment of this sequence.

The search for the monotonic parts of each polyline is easy, from the coordinates of the segment ends recorded in memory.

The delimitation of the monotonic sequences makes it possible to define "surrounding boxes" $B_1$, $B_2$ corresponding respectively to sequences $M_1$, $M_2$ for polyline P and "surrounding boxes" B', B'$_2$, respectively corresponding to sequences M'$_1$, M'$_2$ for polyline Q.

Two edges of each of these surrounding boxes are parallel to the x axis of the frame of reference, whereas two other edges are parallel to the y axis. The positions of these edges are shown by the coordinates of the first and second ends of the end segments of each sequence, the values of which are recorded in memory.

FIG. 10 shows that the boxes $B_1$ and B'$_1$ form an interesting pair since they have a common zone Z1, delimited by the overlapping of these two boxes, in which the first intersection point I1 of the polylines P and Q is located. The same is true for surrounding boxes $B_2$ and B'$_2$ which show a common zone Z2, in which the second intersection point I2 of the two polylines P and Q is located.

Zone Z3, common to the surrounding boxes B'$_1$ and $B_2$ is not interesting, because it does not contain any intersection point.

The preferred embodiment mode will consist, by successive binary subdivisions in the subpanels related to the monotonic parts of each polyline of searching with the surrounding boxes for possible reduced overlapping zones. To accomplish this, each monotonic sequence of each polyline is subdivided into two parts, left and right, the surrounding boxes of which are given without calculation by the end points of these parts. Then the possible overlapping of each of the sub-boxes of a polyline is searched for with each of the two sub-boxes of the other polyline.

FIG. 12 shows how it is possible to determine the two characteristic segments $P_0P_1$ and $Q_0Q_1$ which define this intersection point, after one or more subdivisions of this type. To simplify the understanding of this figure, only the left part of FIG. 10, relative to the intersection point I1, is shown.

Each surrounding box is perfectly delimited and known, since for box $B_1$ for example, Table A of FIG. 11 shows the coordinates of the ends $P_0$ and $P_4$ which delimit this box. The same is true for box B'$_1$, delimited by the coordinates of ends $Q_0$ and $Q_4$. Overlapping zone Z1 of boxes $B_1$ and B'$_1$ defined above, is therefore easy to determine from these coordinates.

However, this zone Z1 contains only one segment $P_0,P_1$ for polyline P, but contains two segments $Q_0Q_1$ and $Q_1Q_2$ for polyline Q. It is therefore impossible to know whether the intersection I1 investigated is defined by intersecting $P_0P_1$ with $Q_0Q_1$ or with $Q_1Q_2$.

A binary subdivision of $B_1$ and B'$_1$ is then performed as shown in FIG. 12, by "dividing" each of these merging boxes into two merging sub-boxes, $B_{11}$ and $B_{12}$ for box $B_1$, B'$_{11}$, and B'$_{12}$ for box $B_2$. Then possible overlapping zones are searched for between sub-box $B_{11}$ of polyline P and sub-boxes B'$_{11}$ and B'$_{12}$ of polyline Q, then between sub-box $B_{12}$ of polyline P and sub-boxes B'$_{11}$ and B'$_{12}$ of polyline Q. Only the overlapping zone 24 of sub-boxes $B_{11}$ and $B'_{11}$ is of interest. However, this zone 24 contains two segments for polyline Q.

A new subdivision is performed of sub-boxes $B_{11}$ and $B'_{11}$, as indicated above, so as to obtain merging sub-boxes, which two sub-boxes $B'_{111}$ and $B'_{111}$, as represented in FIG. 13, overlap according to zone 25. This zone only contains two characteristic segments $P_0P_1$ and $Q_0Q_1$, or portions of these segments, rich allows intersection point $I_1$ to be located in this zone.

The coordinates of Point I are calculated from whole values corresponding respectively to the end coordinates of segments $P_0P_1$ and $Q_0Q_1$. The calculated coordinates of the intersection point are expressed by rational numbers.

The calculation of these coordinates is not given in detail here, because it is known to those skilled in the art. The order of index $i=0$ of the first end $P_0$ of the characteristic segment which is concerned by intersection $I_1$, for polyline P is recorded in memory: and a rational number representing the distance ratio $P_0I_1/P_0P_1$ $(0, \frac{3}{4})$ indicates for example that $I_1$ is $\frac{3}{4}$ segment of the way along $P_0P_1$ from $P_0$).

A similar recording is performed for characteristic segment $Q_0Q_1$ of polyline Q (index $i=0$ of $Q_0$ and the rational number $Q_0I_1/Q_0Q_1$ are recorded).

Finally, the $I_1$ coordinates are also recorded. This calculation is not provided in detail, because it is also known to those skilled in the art.

These parameters (i values corresponding to the first end of each characteristic segment, rational numbers expressing the respective distances between these first ends of the characteristic segments and intersection point $I_1$, and coordinates of point $I_1$ in the frame of reference) belong to an "intersection context."

This intersection context also has additional parameters which will be described in reference to FIG. 14.

These parameters concern the order of appearance of the "strands" around point $I_1$ when the point is turned around in the direction, for example, indicated by arrow F in the figure. These strands are vectors b1, b2, b3, b4 whose origin is point $I_1$. If, for possible subsequent graphic processing, polyline P is transversed from end $P_0$ to end $P_1$ of segment $P_0P_1$, the first strand found is strand $\vec{b3}$, and the strand order around point $I_1$ is therefore $\vec{b3}$, $\vec{b2}$, $\vec{b4}$, $\vec{b1}$. By circular permutation, it known that if segment $Q_0Q_1$, for example, is crossed from $Q_1$, the strand order found around point $I_1$ is then b2, b4, b1, b3. This order may be easily determined by simple geometry calculations from the values of the end coordinates of segments $P_0P_1$ and $Q_0Q_1$.

It is evident that other intersection contexts are recorded for other intersection points.

The flow chart of the program used for performing the processing operations just described is illustrated in FIG. 15, and the operations 151 and 155 which appear on this flow chart are described above.

The preferred embodiment mode just described for polynomial parametric curves remains valid for rational parametric calculations. Actually, treatment performed for rational parametric curves may also be applied to the polynomial parametric curves.

DISPLAY (FIGS. 16–23)

In describing an embodiment for displaying the drawing as it is being created, reference can be had to the diagram of FIG. 8 for a check polygon of curve C of degree 3.

FIG. 16 illustrates display device 1 of display means 2 of Bezier polynomial parametric curve arcs. This display means is connected to computer 3, which is connected to memory 4. The display means in this example is a terminal with screen, but it could also be another suitable display means such as a printer, for example. For any display means used, the display of the curve arcs on the display device 1 is determined by a "pixel" grid 5 or "image elements" 6, defined by lines 7 and columns 8, which are parallel and spaced evenly by a predetermined interval P. These lines and columns are successively scanned. Each pixel such as pixel 6 is located by the intersection of a line and column and is marked by coordinates (X, Y) in the fame of reference. Axes (x, y) of this reference system are, respectively, parallel to the lines and columns of grid 5. A pixel is displayed when the line and column corresponding to it receive display control signals from control means (not shown) of display means 2 under the control of computer 3.

As indicated above, each Bezier polynomial parametric curve, such as curve C FIG. 17, of degree d, is described mathematically by the vectorial function $U(t)=(x(t), y(t))$, in which t belongs to the interval [0,1]. This curve is defined by $d+1$ checkpoints Ui (with $i=0$, $L=1, \ldots, L=d$) in this interval, having actual coordinates $(x_i, y_i)$ in the frame of reference (0, x, y). The coordinates of the checkpoints are recorded in memory 4 of the computer 3 of FIG. 16.

In FIG. 17, PL refers to the polyline interpolating curve C, with an interpolation depth k, and including $n=2^k$ successive segments oriented, for example, in the direction of arrow F. Each segment has two ends on the curve. The display of a curve arc A of curve C, delimited by the parameter pair $(t_d, t_f)$ in the interval [0,1], actually corresponds to displaying the corresponding polyline portion, delimited by starting joint $A_d$ and arrival point $A_f$, by displaying on display device (1), pixels (6) closest to this polyline portion.

According to the invention, interpolation depth (X) of curve (C), corresponding to the arc to be displayed, is calculated using Wang's formula, based on degree d of this curve and diagonal D of the check polygon, itself calculated front the coordinates of the checkpoints, recorded in memory (4) of computer (3). This calculation makes it possible to establish a biunivocal correspondence between order i (ranging from 0 to 8 in the example of FIG. 17) of ends $E_i$ of the polyline segments, and the partition into $2^k$ equal parts, of variation interval [0,1] of parameter t, so that $t_i = i \cdot 2^{-k}$, $t_i$ being the parameter of end $E_i$. In the example shown in FIG. 17, for $i=2$, for example (corresponding to end $E_2$), $t=\frac{1}{2}$ is thus obtained.

This biunivocal correspondence makes it possible to establish transformation $(td,tf) \rightarrow (i,u)$, $(j,v)$, which with parameters $(t_d, t_f)$ makes two pairs of values (i, u), (j, v) correspond so that $t_d = i \cdot 2^{-k} + u$ and $t_f = j \cdot 2^{-k} + v$, with $u < 1$ and $v < 1$.

This correspondence brings the coordinates $t_d$ and $t_f$ of the curve arc to be displayed, measured in reference system (0, x, y), to the respective coordinates of starting point $A_d$ and arrival point Af of the corresponding polyline portion, measured on this polyline.

FIG. 18 makes it easier to understand this transformation. Only two segments $E_1E_2$ and $E_6E_7$ are shown. Starting points $A_d$ and arrival points $A_f$ are respectively located on these segments. It is always possible to determine vector $\vec{u}$ on $E_1E_2$, of module $u = E_1A_d/E_1E_2$, and vector $\vec{v}$ or $E_6E_7$ of module $V=E_6A_f/E_6E_7$. In the example shown in the figure, for example, $u=\frac{1}{3}$ and $v=2/3$. The pair of values $(1, \frac{1}{3})$, corresponding to the order $i=1$ of the first end $E_1$ of segment $E_1E_2$ and to the rational number $u=\frac{1}{3}$, are therefore recorded in memory for point $A_d$. Similarly, for point $A_f$, the pair of values $(6, 2/3)$, corresponding to order $j=6$ of the first end $A_6$ of segment $E_6E_7$ and to the rational number $v=2/3$, are recorded. With the pair of parameters $(t_d, t_f)$ it is possible to make the pairs of values $(1, \frac{1}{3})$ and $(6, 2/3)$ correspond. The polyline represented in the example has $N=8=2^3$ segments, so that $k=3$. As a result, $d=i\cdot 2^{-k}+u=\frac{1}{8}+\frac{1}{3}$ and $t_f=j\cdot 2^{-k}+v=6/8+2/3$.

When this transformation is established, one has to calculate recursively, as described above (in relation with FIG. 8) in frame of reference (0, x, y), the coordinates of $i+1$ ends of the polyline segments. This makes it possible to calculate the coordinates of starting point $A_d$ from coordinates of ends $E_i$ and $E_{i+1}$ of segment $E_iE_{i+1}$, on which point $A_3$ is located, so that $A_d=E_i+u(E_{i+1}-E_i)$. In the example shown in FIG. 4, if $(x_d, y_d)$ represent the coordinates of $A_d$, $x_1,y_1$ the coordinates of $E_1$, and $(x_2, y_2)$ the coordinates of $E_2$, then $$x_d=x_1+\tfrac{1}{3}(x_2-x_1)$$

$$y_d=y_1+\tfrac{1}{3}(y_2-x_1)$$

The coordinates of $i+1$ segments of the polyline, as well as the coordinates of the starting point $A_d$, are recorded in memory.

We then calculate by recursion, as described above (in relation with FIG. 8), the end coordinates $E_{i+2}$ to $E_{j+1}$ of the polyline segments, to calculate the coordinates of the arrival point $A_f$ from the coordinates of the ends $E_j$ and $E_{j+1}$ of segment $E_jE_{j+1}$, on which the arrival point $A_f$, is located so that $A_f=E_j+v(E_{j+1}-E_j)$. The coordinates of the ends $E_{i+2}$ through $E_{j+1}$ (E3 through E7 in the example) of the segments to be displayed, are recorded in memory, as well as the coordinates of end $A_d$ of the segment $A_dE_2$ to be displayed.

In the example shown in FIG. 4, if $(x_f, y_f)$ represent the coordinates of $A_f$, $(x_6,y_6)$ the coordinates of $E_6$, and $(x_7, y_7)$, the coordinates of $E_7$, then:

$$x_f=x_6+2/3(x_y-x_6)$$

$$y_f=y_6+2/3(y_7-y_6)$$

The coordinates of the end $A_f$ of the segment portion $E_6A_f$ to be displayed are recorded in memory.

According to the invention, as soon as the coordinates of the ends of one segment portion (such as $A_dE_2$ for example) or a segment $(E_2, E_1, \ldots, E_5E_6)$ are recorded, a pixel sequence to be displayed is determined to create this portion of the segment or this segment belonging to the polyline portion to be displayed.

FIG. 19 makes it easier to understand the search for the selection of the pixel sequences to be displayed. This figure shows a segment or segment portion BC in pixel grid 5 of the display device, as well as a segment CD in this grid. These two segments or segment portions belong to the polyline portion corresponding to the arc to be displayed.

To determine each pixel sequence to be displayed for each segment or segment portion, one selects near this segment the pixels whose distances to the segment, measured along scanned lines 7 or scanned column lines 8 which intersect this segment, are less than half the interval of the grid (P/2).

For segment BC, for example, the distances of the pixels to be displayed are measured along lines 7, for reasons which will be explained below. Accordingly, pixel $P_1$ (intersection of the line L71 and column C81) is a pixel to be displayed, because its distance d1, measured along line L71, is less than P/2. P'1 is not selected, because its distance d'1 to segment BC is greater than P/2. The other pixels to be displayed for the sequence relative to segment BC are P2, P3, P4, P5.

From segment CD, the distances of the pixels to be displayed are measured along columns C (8), for reasons which will be explained below. Accordingly, pixel P6 (intersection Cf column C86 and of line L76) is a pixel to be displayed, because its distance d6, measured along column C86, is less than P/2. P'6 is not selected because its distance d'6 measured along column C86 is greater than P/2. The other pixels to be displayed, for the relative sequence to segment CD, are P7, P8, ..., P12.

FIGS. 20 and 21 will provide a better understanding of the selection of the pixels to be displayed.

To perform this selection, as shown in FIG. 20, the plane of the display device is subdivided into eight octants marked by predetermined order numbers. The scanning lines of the display device are parallel to the primary axis x of the frame of reference, whereas the columns of the medium are parallel to the secondary axis y of this reference system. These octants each have an angular extent of 45 degrees, and they are numbered 00, 01, 11, 10, 20 21, 31, and 30, as indicated in the figure. The first digit in the number of each octant is the number of the quadrant of the reference system in which the octant lies. The second digit is 0 if the octant contains points whose coordinates have absolute values on the primary axis x that are greater than the absolute values on the secondary axis y. This octant is then said to have a "dominant" x. There are therefore four octants with a dominant x: 00, 10, 20, 30.

The second digit in the octant number is 1 if the octant contains points whose coordinates have absolute values on the secondary y axis that are greater than the absolute values on the primary axis x. This octant is said to be a "dominant" y. There are therefore four octants with a dominant y: 01, 11, 21, 31.

When this subdivision is established, the process of the invention then consists, for each segment portion or for each segment to be displayed, of determining the order number of the octant containing these ends. In FIG. 19, the segment BC, for example, is located in octant 01 with dominant y, whereas segment CD is located in octant 00 with dominant x.

The lines or columns intersecting each segment to be displayed are scanned. For any segment whose ends are in an octant with dominant x, the pixels selected from among the pixels adjacent to this segment and located at the intersections with it are the pixels for which the respective distances to this segment, measured on the secondary axis y, are less than P/2.

Accordingly, in the example of FIG. 19, for segment CD, the octant concerned is 00 and the distances are such that d6 or d'6 are measured on the secondary axis y.

Similarly, for any segment whose ends are in an octant with dominant y, the pixels selected from among the pixels adjacent to this segment and located at the intersections of lines with it are the pixels for which the respective distances to this segment, measured on the primary axis x, are less than P/2.

In the example of FIG. 19, for segment AB, the octant concerned is 01, and the distances are such that d1 or d'1 are measured on the primary axis x.

The coordinates of the pixels selected are of course those of the pixels to be displayed. The computer then controls the display means, to trigger the display of the selected pixels.

FIG. 21 allows better understanding of the process for determining the distance of a "candidate" pixel from the segment to be displayed. This figure shows a segment to be displayed in octant 00 and two lines (L71, L72) and two columns (C81, C82), the intersections of which are adjacent to this segment. It is assumed that the pixel P1, of coordinates (x, y) in the frame of reference, is a pixel adjacent to this segment, and that it is as candidate to be displayed. ($x_M$, $y_M$) represent the coordinates in the reference system of the intersection point M of column 82 with segment AB, and $d_i$ represents the distance separating the candidate pixel and segment AB.

For this pixel belonging to octant 00, with dominant x, as well as for all pixels of the octants with dominant x (00, 10, 20, 30), it is easy to show that:

$$d_i = Y_M - y = \frac{y_B - y_A}{x_A - x_B}(X - x_A) - (y - y_A)$$

Similarly, it is easy to show that for all pixels to be displayed with segments located in the octants with dominant y (01, 11, 21, 31), the distance $d_i$ is expressed by the following relation:

$$d_i = x_M - X = \frac{x_B - x_A}{y_A - y_B}(Y - y_A) - (x - x_A)$$

The values of the quantities $x_B - x_A$ and $y_B - y_A$ are used to determine the octant which the AB segment to be displayed belongs to.

The selection of the X, Y coordinates of the first pixel to be displayed takes place as follows, for octant 00: if $x_A$ and $y_A$ are the coordinates of point A, end of a segment (recorded in memory), and if these coordinates are measured with values exhibiting respectively a whole part and a non-whole part, [XA] represents the whole part of the value $x_A$, and [$x_A$] represents the whole part of the value of $x_A$ increased by one unit. In the same way, [$y_A$] represents the whole part of the value of $y_A$, and [$y_A$] represents the whole part of the value of $y_A$ increased by one unit. For the different octants, the coordinates (C, Y) of a pixel to be displayed are selected so that X=$x_A$, or X=[$x_A$] or Y=$y_A$ or Y=[$y_A$] depending on the octant considered.

The selection of the octants is indicated in the following table:

| octants: | | |
|---|---|---|
| 00 | X = [$x_A$] | Y = $y_A$ |
| 01 | X = [$x_A$] | Y = [$y_A$] |
| 10 | X = [$x_A$] | Y = [$y_A$] |
| 11 | X = [$x_A$] | Y = [$y_A$] |
| 20 | X = [$x_A$] | Y = [$y_A$] |
| 21 | X = [$x_A$] | Y = [$y_A$] |
| 30 | X = [$x_A$] | Y = [$y_A$] |
| 31 | X = [$x_A$] | Y = [$y_A$] |

The absolute value of the distance $d_i$ is evaluated in these steps:

the possible pixel candidate is selected from coordinates X, Y as defined by the table above, the distance $d_i$ is evaluated as indicated above, if $d_i$ is greater, in absolute value, than half the value of the grid increment, another pixel is selected for which the coordinates (X, Y) are such that $d_i$ is less, in absolute value, than half the value of the grid increment.

For one end B of a segment of the polyline portion corresponding to the arc to be displayed, $x_B$ and $Y_B$ represent the coordinates of the end B whose values include a whole part and an non-whole part, $x_B$ represent the whole part of the value of $x_B$ and $x_B$ the whole part of the value of $x_B$ increased by one. In the same way, [yB] represents the whole part of the $Y_B$ value and [yB] be the whole part of the $Y_B$ value increased by one unit.

The selection of the coordinate XE or YE of the last pixel corresponding to the end B of the segment, depends on the octant where this end is located, and is given by the following table:

| octants: | |
|---|---|
| 00 | $X_E = x_B$ |
| 01 | $Y_E = y_B$ |
| 10 | $X_E = x_B$ |
| 11 | $Y_E = y_B$ |
| 20 | $X_E = x_B$ |
| 21 | $Y_E = y_B$ |
| 30 | $X_E = x_B$ |
| 31 | $Y_E = y_B$ |

This coordinate XE or YE makes it possible to determine the number of iterations of the display calculation.

On each scanning line or column, it is necessary to determine whether the candidate pixel or the next pixel on this line or column should be considered for display.

This determination is performed by determining, depending on the octant, whether the distance $d_i$ separating the pixel to be displayed and the segment is less than P/2 or greater than $-P/2$, as defined in the following table:

| octants: | |
|---|---|
| 00 | $d_i < P/2$ |
| 01 | $d_i < P/2$ |
| 10 | $d_i < P/2$ |
| 11 | $di > -P/2$ |
| 20 | $d_i > -P/2$ |
| 21 | $d_i > -P/2$ |
| 30 | $d_i > -P/2$ |
| 31 | $d_i < P/2$ |

This table shows that if $d_i$ is less, in absolute values, than P/2, the pixel to be displayed should be selected. Otherwise, it is the next pixel which should be selected, on the scanned line or column.

Finally, it is possible that for two consecutive segments $E_{i-i}$ and $E_iE_{i+1}$ of the polyline portion to be displayed, and as represented in FIG. 22, a "jump" occurs in the sequence of the pixels to be displayed. This jump appears near the end $E_i$ of segments $E_{i-1}E_i$ and $E_iE_{i+1}$ where two consecutive pixels P1 and P2 are distant by more than one unit from the increment p of the grid. In this case, when necessary, one extra pixel ice added, for example P3, to fill this jump. This jump is easy to detect from the coordinates of pixels P1 and P2. The additional pixel to be added is determined, according to the octant, by scanning the line or column which follows pixels P1 or P2, and by searching for a pixel to be displayed whose distance from one of the segments is less in absolute value than half an increment P/2 of the grid.

FIG. 23 is a flow chart of the basic operations of a program, recorded in memory, making it possible to implement the process of the invention. The operations 231 to 235, which appear in the flow chart, were described above. This flow chart shows that the determination of the pixels to be displayed for each segment or segment portion is undertaken when the end coordinates of each segment or segment portion are obtained.

The description just given for displaying the arcs of polynomial parametric curves remains valid for displaying the arcs of rational parametric curves. In effect, the processing for the rational parametric curves can be similar to the processing performed for polynomial parametric curves.

Moreover, the process of the invention has the following property of consistency: if the set of pixel sequences to be displayed is taken into consideration to visually display an arc of a curve, and if one portion of this curve arc is considered, the pixel sequences to be displayed in order to visually display this portion form a subset of the set of sequences to be displayed to display the arc. More specifically, if the pixels are displayed that allow one portion of a curve arc to De displayed, it is certain that with the process of the invention the pixels which are to be displayed to display the entire arc have the same coordinates, in the part common to the arc and to the arc portion: the calculated coordinates of the pixels to be deleted for this arc portion correspond respectively to the calculated coordinates of the pixels displayed for this portion. This property allows proper "erasure" of one arc portion of a curve.

It is apparent from the foregoing that a new and improved process for making computer-aided drawings has been provided. While only certain presently preferred embodiments have been described in detail, as will be apparent to those familiar with the art, certain changes and modifications can be made without departing from the scope of the invention as defined by the following claims.

What is claimed is:

1. In a process for creating a drawing using a computer having a processor, memory, and a display coupled to said computer; a process comprising the steps of:

partitioning said memory into a plurality of predefined data fields for receiving and recording data for describing any drawing in the form of a planar map having a set of faces, whereby said partitioning forms a data structure in said memory for describing any drawing in the form of a planar map having a set of faces;

initializing said partitioned memory prior to creating a particular drawing by recording in said predefined data fields initial values representing an empty drawing so that said data structure and said planar map are initially empty of data describing said particular drawing prior to creating said particular drawing;

creating said particular drawing by performing insertion, erasure, and coloring operations; said insertion and erasure operations comprising inserting and/or erasuring said curves and/or elements of said curves into said particular drawing until obtaining said particular drawing as desired; said coloring operations comprising coloring one or more of said faces delimited by said contours produced by curve edges of said drawing;

generating parameters to describe said curves and/or elements of said curves of said particular drawing in the form of a planar map having a set of faces and recording said parameters into said predefined data fields in response to an insertion operation;

each said face being delimited by one or more contours produced by curve edges of said particular drawing, said planar map being associated with a contour inclusion tree;

suppressing elements of said parameters describing said particular drawing in response to an erasure operation;

whereby said data structure in memory describes said particular drawing in the form of a planar map having a set of faces delimited by one or more contours produced by curve edges at every stage of creation;

displaying said particular drawing on said display during any stage of its creation; and performing update operations, including updating said data recorded in said data fields of said partitioned memory describing said particular drawing.

2. The process of claim 1, wherein said insertion operation includes the steps of:

acquiring said curve using an input peripheral, displaying said curve on said computer screen, inserting said curve in said planar map described by said parameters in said data structure defined by said partitioned memory.

3. The process of claim 2, wherein said insertion of a curve c into the planar map comprises the steps of:

combining with the curve to be inserted the parameters $t_o$ and $t_n$, where $t_o$ corresponds to the origin $P_0$ of the curve, and $t_n$ corresponds to the other end $P_n$ of the curve;

locating the face of the map containing the origin of the curve to be inserted whose parameter is $t_o$;

assigning to parameter $t_i$ the value of parameter $t_o$; then, iteratively:

determining the intersections between the curve of parameter $(t_i, t_n)$ to be inserted and all curves produced by the contour edges of the face;

inserting the parameter intersection points $t_j$ on the arc $(t_i, t_n)$;

assigning parameter $t_{i+1}$ to the intersection point $t_j$ according to the parameter point $t_i$; and inserting the arc whose parameter is $(t_i, t_{i+1})$ into the face under consideration by recording it in memory.

4. The process of claim 3, wherein said face in which the origin of the curve to be inserted is located is found by the steps of:

fictitiously inserting a straight line $D_o$ whose origin $P_0$ is the origin of the curve to be inserted, and whose end is a known point $P_c$ located in the first face of an infinite face;

determining any intersections that exist between said straight line $D_o$ and all curves;

if any intersections are determined:

calculating a distance d between these intersections and said origin point $P_0$, determining the edge e for which said distance d is minimum, recording said origin $P_0$ in the face to which the strand of an edge e which sees $P_0$ belongs;

if no intersections are determined:

recording said origin $P_0$ in said first face.

5. The process of claim 4, wherein the step of determining the intersections between the curve of parameter $t$, and all other curves produced by the contour edges of the face, said curves being Bezier polynomial parametric curves of degree d being mathematically described by the vectorial function $U(t)=(x(t), y(t))$, with $0<t<1$ and being defined by $d+1$ checkpoints $U_i$, with $i=0, 1, \ldots, d$, delimiting a check polygon, each checkpoint $U_i$ having actual coordinates $(x_i, Y_i)$ in a frame of reference, which coordinates are recorded in computer memory, comprises the steps of:

interpolating the curves with polylines (P, Q) each of said polylines being formed of N successive segments, and having two ends located on a corresponding curve arc;

selecting the number N of segments of each polyline in relation with the interpolation depth k so that $N=2^k$, and K being specific for each curve, this depth being given by the relation $$k = \left\lceil Log_4 \frac{d(d-1)}{8} D \right\rceil,$$

where D is the diagonal of a check polygon, calculated by the computer from the coordinates of the checkpoints recorded in memory;

determining the coordinates $(x_{i+1}, y_{i+1})$ of the ends of the segments of each polyline, between checkpoints $U_0$ and $U_d$ by recurrent computer calculations, by evaluating a priori the upcoming differences $(dx_i, dy_i)$ that must be added to the coordinates $(x_i, y_i)$ of the end of a segment to pass to the coordinates $(x_{i+1}, y_{i+1})$ of the end of he next segment on the polyline, so that:

$$x_{i+1} = X_i + dx_i \text{ and } y_{i+1} = y_i + dy_i$$
$$\text{with } dx_{i+1} = dx_i + d^2x_i \text{ with } dy_{i+1} = dy_i + d^2y_i$$
$$d^2x_{i+1} = d^2x_i + d^3x_i \quad d^2y_{i+1} = d^2y_i + d^3y_i$$
$$| \quad | \quad | \quad |$$
$$dd - 1_{x_{i+1}} = dd - 1_{x_i} + dd_{x_i} \quad dd - 1_{y_{i+1}} = dd - 1_{y_i} + dd_{y_i},$$

with $0 \leq i < N$, each intersection point $(I_1, I_2, \ldots)$ of two curves being determined by the intersection of two characteristic segments $(P_0P_1, Q_0Q_1)$ belonging respectively to two polylines respectively interpolating the two curves;

recording said coordinates of the segment ends of each polyline in memory in an ordered manner according to increasing i values between 0 and N.

6. The process of claim 2 wherein the drawing is displayed from polynomial parametric curves formed of arcs on the display screen of the computer, the display on the screen being determined by a pixel grid defined by parallel lines and columns which are evenly spaced by predetermined increment and successively scanned, with each pixel being located by an intersecting line and column and being displayed when the corresponding line and column receive display control signals during a scanning, the pixels of the grid being marked by coordinates (x,y) in a frame of reference (0, x, y) having a primary axis (x) and a secondary axis (y) parallel, respectively, to the lines and columns in the grid, each curve of degree d being mathematically described by the vectorial function $U(t)=(x(t), y(t))$ of a parameter t, with $0 \leq t \leq t$ and being defined by: $d+1$ checkpoints $U_i$, with $i=0, 1, \ldots, d$, delimiting a check polygon, with each check polygon $U_i$ having real coordinates $(x_i, Y_i)$ in the frame of reference, said coordinates being recorded in memory associated with the computer, each curve being capable of being interpolated by a polyline having an interpolation depth and having N successive oriented segments with two ends located on the curve, the display of a curve arc being delimited by a pair of parameters $(t_d, t_f)$ in the interval [0, 1] of the curve U(t) by the steps of:

displaying one portion of the polyline corresponding to the arc delimited by a starting point $(A_d)$ and an arrival point $(A_f)$, displaying the pixels closest to this polyline portion, and also for each arc:

calculating the interpolation depth k of the curve corresponding to this arc, based on degree d of the curve and the diagonal D of the check polygon, calculated from the recorded coordinates of the checkpoints, to establish a biunivocal correspondence between order i of ends $E_i$ of the polyline segments and partitioning the interval [0,1] of parameter t, into $2^k$ equal parts so that $t_i = i \cdot 2^{-k}$, where $t_i$ is the parameter of end $E_i$, establishing a transformation $(t_d, t_f) \rightarrow (i, u), (j, v)$ which with the parameters of the pair $(t_d, t_f)$ make two pairs of values (i, u), (j, v) correspond so that $t_d = i \cdot 2^{-k} + u$ and $t_f = j \cdot 2^{-k} + v$, with $u < 1$ and $v < 1$, performing recurrent calculations of the coordinates of $i+1$ first segment ends of the polyline in the frame of reference to calculate the coordinates of starting point $A_d$ based on the coordinates of segment ends $E_i$ and $E_{i+1}$ of the polyline, with $A_d = E_i + u(E_{i+1} E_i)$, $A_d E_{i+1}$ being a segment portion to be displayed, recording the coordinates of $A_d$ and $E_{i+1}$ in memory, performing recurrent calculations of the coordinates of segment ends $E_{i+2}$ to $E_{j+1}$ of the polyline in the frame of reference to determine the coordinates of the arrival point $A_f$ based on the coordinates of ends $E_j$ and $E_{j+1}$, so that $A_f = E_j + v(E_{j+1} - E_j)$, with the segments corresponding to ends $E_{i+1}$ to $E_j$, as well as the segment portion $E_j A_f$ to be displayed, recording the coordinates of ends $E_{i+2}$ to Af in memory, and determining a pixel sequence to be displayed, after the end coordinates of each segment or segment portion to be displayed are recorded in memory, with the pixels of each sequence near this segment being capable of being displayed when the distances separating these pixels from the corresponding segment measured in the frame of reference along the scanned lines or columns which intersect the segment are in absolute value less than half the value of the pixel grid increment.

7. The process of claim 6 wherein the recurrent calculation of the coordinates of the segment ends of a polyline interpolating a curve comprises selecting a number N of segments of each polyline in relation with the interpolation depth k, so that $N=2k$, this depth being given by relation:

$$k = \left\lceil Log_4 \frac{d(d-1)}{8} D \right\rceil,$$

where D is the value of the diagonal of the check polygon calculated by the computer, based on the checkpoint coordinates recorded in memory; then determining the coordinates $(x_{i+1}, Y_{i+1})$ of the segment ends of each polyline between the checkpoints $U_0$ and $U_d$ by recurrent computer calculation, by first evaluating the upcoming differences $(dx_i, dy_i)$ that must be respectively added to the coordinates $(x_i, y_i)$ of the end of a segment to pass to coordinates $(x_{i+1}, y_{i+1})$ of the end of the next segment on the polyline so that:

$$x_{i+1} = X_i + dx_i \text{ and } y_{i+1} = y_i + dy_i$$
with $dx_{i+1} = dx_i + d^2x_i$ with $dy_{i+1} = dy_i + d^2y_i$
$d^2x_{i+1} = d^2x_i + d^3x_i \; d^2y_{i+1} = d^2y_i + d^3y_i$
| | | |
$dd - 1_{xi+1} = dd - 1_{xi} + dd_{xi} \; dd - 1_{yi+1} = dd - 1_{yi} + dd_{yi}$, with $0 < i < N$, the end coordinates of the segments of each polyline are recorded in memory in an ordered manner, according to increasing i values between 0 and N.

8. The process of claim 7 wherein the pixels to be displayed are determined by:
subdividing the plane of the display device into eight octants marked by predetermined order numbers, four of said octants having a dominant x when the coordinates of the points located in these octants have absolute values on the primary axis (x) greater than the absolute values on the secondary axis (y), the other four of said octants having a dominant y when these coordinates of points located in these other four octants have absolute values on the secondary axis (y) greater than the values on the primary axis (x),
scanning the lines or columns intersecting each segment to be displayed,
for any segment whose ends are in an octant with dominant (x), making a selection among the pixels adjacent to this segment and located at the column intersections with this segment those for which the respective distances to this segment, measured on the secondary axis (y), are in absolute value less than a half grid increment (P/2),
for any segment whose ends are in an octant with dominant (y), making a selection among the pixels adjacent to this segment and located at the line intersections with this segment of those for which the respective distances to this segment, measured on the primary axis (x), are less in absolute values than a half grid increment (P/2),
and recording in memory the coordinates of the pixels selected in the display frame of reference, said coordinates being the coordinates of the pixels to be displayed.

9. The process of claim 8 wherein the sequences of pixels that will display a portion of a curve arc form a subset of the set of the sequences of pixels that will display this arc.

10. The process of claim 3 wherein the coordinates of each intersection point of the two curves, based on the intersection of the two characteristic segments, are determined by reducing to whole values the values of the respective end coordinates of the segments of each polyline (P, Q) calculated by the computer, said whole values corresponding respectively to the whole coordinates of the points of a grid (G) of the frame of reference (0, x, y), respectively the closest to the ends of the polyline segments, said whole values being recorded in memory.

11. The process of claim 10 wherein the coordinates of each intersection point $(I_1, I_2, \ldots)$ of the two curves are based on the whole values corresponding respectively to the respective end coordinates of two characteristic segments belonging respectively to the two polylines respectively interpolating the two curves near each intersection point.

12. The process of claim 11 wherein the two characteristic segments $(P_0P_1, Q_0Q_1)$ are determined by searching for monotonic sequences in the polylines (P, Q) of each curve, from the whole values of the end coordinates of these polylines recorded in memory, each of said monotonic sequences corresponding to a succession of segments delimited by one end of a first extreme segment and by a second end of a second extreme segment to delimit for each monotonic sequence, a surrounding box $(B_I \text{ or } B'_1 \text{ or } B_2 \ldots)$ having two edges parallel to the first axis of the frame of reference and two edges parallel to the second axis of the frame of reference, the surrounding box being delimited by said first and second ends of the extreme segments of the corresponding monotonic sequence and the characteristic segments being located respectively in the two surrounding boxes; and forming a pair of boxes belonging respectively to two respective monotonic sequences of two polylines, the two boxes of said pair overlapping at least partially along a common zone with said characteristic segments being located in said common zone.

13. The process of claim 12 wherein successive pairs of surrounding sub-boxes are obtained by making successive subdivisions of the monotonic sequences of the polylines, and calculating the coordinates of each intersection point when, after the successive subdivisions are made, the surrounding sub-boxes of the pair obtained by the subdivisions containing only two characteristic segments.

14. The process of claim 13 further including the steps of recording in memory for each intersection point an intersection context containing the order number of the origin of each characteristic segment, the ratio $P_0I_1/P_0P_1$ or $Q_0I_1/Q_0Q_1$ of the distance $P_0P_1$ or $Q_0I_1$ between the intersection point $I_1$ and the origin $P_0$ or $Q_0$ of each characteristic segment to the length $P_0P_1$ or $Q_0Q_1$ of this characteristic segment, the coordinates of the intersection point measured in the frame of reference, and the order of the strands corresponding to each segment, around one intersection point.

15. The process of either claim 4 or claim 14 wherein an arc $a_i$ produced by an edge e and by two determined stands of e is inserted into the planar map by the steps of:
creating a vertex S, S' for each strand of edge e by recording the vertices S and S' in the data structure in said partitioned memory in the case where these vertices are not already in the planar map; and
creating the edge e by recording it in the data structure in said partitioned memory containing arc $a_i$ and one of two strands in the case where this edge does not already exist in the planar map.

16. The process of claim 4 further including the steps of comparing the parameter $t_{i+1}$ with the parameter $t_n$ after inserting an arc ($t_i$, $t_{i+1}$), and going on to the next face when these two parameters do not correspond.

17. The process of claim 16 including the step of comparing each face with the faces already processed in order to directly insert the arc of the parameters ($t_i$, $t_{i+1}$) into this face if the face was already processed and, otherwise, passing to a new face.

18. The process of claim 17 including the step of inserting or suppressing an edge to update the contour inclusion tree.

19. The process of claim 18 wherein the contour inclusion tree is updated in the case of an insertion for an edge e produced by arc $a_i$ of parameters ($t_i$, $t_{i+1}$) by the steps of:
 a) first, listing in the form of a memory table a set of possible cases for an edge in a planar map;
 b) then, after inserting an arc a-:
  determining by comparison with the different possible cases the case of edge e produced by arc $a_i$;
 c) updating the contour tree as a function of the previously determined case by:
  suppressing a contour when the two contours are merged, or
  creating a new contour which becomes the son or brother of the contour divided in the contour tree.

20. The process of claim 18 wherein the contour inclusion tree is updated in the case of a suppression for an edge e corresponding to the $t_i$, $t_{i+1}$ inserted parameter arc, the steps of:
 a) first listing in the form of a table in memory a set of possible cases for an edge in a planar map;
 b) for the edge e to be suppressed:
  listing the number of hanging vertices of the edge, the type of internal or external contour which the edge strands belong to,
  determining the case of this edge by comparison with the different possible cases of the table;
 c) then updating the contour tree as a function of the case determined by performing a suppression, a division, or no modification.

21. The process of claim 4 wherein the step of determining the intersections between the curve to be inserted and a given face includes a step for marking this face.

22. The process of claim 21 wherein the step of marking the face includes the step of reserving a field in the coding of a face in memory capable of being filled in after the intersections between the parametered arc $t_i$, $t_n$ and the face are determined.

23. The process of claim 1, wherein the operation of coloring a face is performed by the steps of:
 acquiring a point to be located with an input peripheral,
 locating the acquired point in the planar map representation of the drawing described by the data structure in said partitioned memory,
 depending on the locating case:
  a) specifying the color by marking the face in the planar map representation of the drawing described by the data structure in said partitioned memory, and
  b) showing the color during the display.

24. The process of claim 1, wherein an operation for erasure of a curve and/or an element of a curve comprises the steps of:
 a) acquiring the curve or element of a curve to be erased using an input peripheral,
 b) locating the curve or element of a curve so acquired in the planar map representation of the drawing in said partitioned memory, and
 c) erasing the element from the display.

25. The process of claim 24 wherein the erasure of a curve and/or an element of a curve in a planar map is effected by the steps of:
 performing a suppression in the data structure formed in said partitioned memory, for vertices, edges, and contours associated with the curve,
 storing in the data structure in memory the arcs and points defining the curve, and
 filling in the field provided in the data structure in memory relative to the arcs and points signifying that the elements corresponding to the arcs and to the points are erased.

26. The process of claim 25 wherein erasure of the hanging edges of a contour, a face, a component, or a map is effected by the steps of:
 (a) searching for an edge e for which at least one vertex is hanging; and
 (b) if the edge e exists:
  (1) storing the nonchanging vertex s of e,
  (2) suppressing edge e,
  (3) if s becomes a vertex during the B(b) step, reiterate in B(a) with an edge e incident to s,
  (4) reiterating step (a).

27. An apparatus for creating drawings, said apparatus comprising:
 a computer having memory;
 means for partitioning said memory into predefined data fields for receiving parameters corresponding to topographical and geometrical representations of drawing elements; said partitioned memory defining a data structure for describing any drawing in said memory;
 said data structure describing said any drawing in the form of a planar map having a set of faces, with each said face being delimited by one or more contours produced by curve edges of said drawing, said planar map being associated with a contour inclusion tree stored in said memory, said data structure and said planar map being initially empty of data describing a particular drawing prior to creating said particular drawing and describing said particular drawing in all steps of its creation;
 means for initializing said predefined data fields of said partitioned memory with initial parameter values representing an empty planar drawing;
 input peripheral means for acquiring said curves, said input peripheral means connected to said computer;
 means for creating a drawing comprising means for insertion, means for erasuring, and means for coloring said planar map;
 said means for inserting for inserting said curves and/or elements of said curves, and said means for erasure for erasuring said curves and/or elements of said curves, until obtaining said particular drawing as desired;
 said means for coloring for coloring one or more of said faces delimited by said contours;
 computer display screen means for displaying said particular drawing during any stage of creation; and
 memory updating means for updating said parameters describing said particular drawing in said partitioned memory at every stage of creation.

28. In a process for making a drawing using a computer system including a computer, computer memory, and a display device connected to said computer for displaying said drawing; a process comprising the steps of:

partitioning said computer memory into predefined data fields to receive and record data corresponding to topographical and geometrical representations of drawing elements;

initializing said predefined data fields of said partitioned memory with initial data values representing an empty planar drawing;

creating said drawing by performing insertion, erasure, and coloring operations, said insertion and erasure operations comprising inserting and/or erasuring drawing elements including curves and/or elements of said curves until obtaining said drawing as desired, said coloring operations comprising coloring one or more of drawing faces delimited by said curves and/or elements of said curves;

generating a topological data representation and a geometrical data representation of each drawing element for each of said inserted drawing elements and recording said topological data and geometrical data in said predetermined fields within said partitioned computer memory as each said drawing element is inserted;

suppressing said topological data representation and marking as erased without suppressing said geometrical data representation in said predetermined fields within said partitioned computer memory for any previously inserted drawing element corresponding to a presently erased drawing element as each said drawing element is erased;

generating a planar map representation of said drawing within said partitioned memory by partitioning said drawing into a finite number of planar faces at each stage of said drawing creation based on said generated topographical and geometrical data representations for all inserted drawing elements, each said face being delimited by one or more contours produced by curve edges of said drawing, said planar map being initially empty of planar faces prior to insertion of a drawing element;

displaying said drawing on said display in all stages of said drawing creation; and performing update operations, including updating said data describing said drawing.

29. The process in claim 28, wherein said partitioning of said computer memory comprises the steps of:

partitioning said memory into a plurality of data fields including data fields to receive topological data corresponding to contours, vertices, edges, and strands; whereby a topological data structure is generated; and partitioning said memory into a plurality of data fields including data fields to receive geometrical data corresponding to points linking with a vertex, arc linking with an edge, and strands attached to arcs; whereby a geometric data structure is provided; and whereby said strands provide links between said geometric data structure and said topological data structure.

30. The process in claim 29, wherein said step of generating and recording topological data includes:

generating data from each said drawing element representing contour, vertex, edge, and strand information;

organizing said contour, vertex, edge, and strand information to provide a topological data structure representing said drawing element; and recording said contour, vertex, edge, and strand information within said partitioned computer memory.

31. The process in claim 29, wherein said step of generating and recording geometrical data includes:

generating data from each said drawing element representing points linked with a vertex, arcs linked with an edge, and strands attached to arcs;

organizing said data to provide a geometrical data structure representing said drawing element in said computer memory; and recording said data representing points linked with a vertex, arcs linked with an edge, and strands attached to arcs information within said partitioned computer memory.

32. The process in claim 29, wherein said step of generating a planar map representation of said drawing by partitioning said drawing into a finite number of planar faces at each stage of said drawing creation includes:

partitioning said drawing plane into a finite set of faces using a finite set of curves to generate said planar map; and generating said planar map by identifying the pair of data elements which comprise a first element corresponding to a finite set of distinct vertices and a second element corresponding to a finite set of edges, said edges defined by curve arcs having no intersections other than said vertices.

\* \* \* \* \*

UNITED STATES PATENT AND TRADEMARK OFFICE
CERTIFICATE OF CORRECTION

PATENT NO. : 5,337,404
DATED : August 9, 1994
INVENTOR(S) : Baudelaire et al.

It is certified that error appears in the above-identified patent and that said Letters Patent is hereby corrected as shown below:

Column 25,
Line 11, delete "$t_1$and" and insert therefor -- $t_1$ and --
Line 17, delete "$x_i$, Y" and insert therefor -- $x_i$, y --

Signed and Sealed this

Twenty-first Day of June, 2005

JON W. DUDAS
*Director of the United States Patent and Trademark Office*